United States Patent
Buchmueller et al.

(10) Patent No.: US 8,971,641 B2
(45) Date of Patent: Mar. 3, 2015

(54) SPATIAL IMAGE INDEX AND ASSOCIATED UPDATING FUNCTIONALITY

(75) Inventors: Daniel Buchmueller, Seattle, WA (US); Michael Kroepfl, Bellevue, WA (US); David Z. Nister, Bellevue, WA (US); Vadim Cugunovs, Seattle, WA (US); Blaise Hilary Aguera-Arcas, Seattle, WA (US); Scott V. Fynn, Seattle, WA (US); Eyal Ofek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 350 days.

(21) Appl. No.: 12/969,610

(22) Filed: Dec. 16, 2010

(65) Prior Publication Data

US 2012/0155778 A1 Jun. 21, 2012

(51) Int. Cl.
*G06K 9/62* (2006.01)

(52) U.S. Cl.
USPC ............. 382/209; 382/216; 382/170; 348/77; 348/231.3; 348/207.1

(58) Field of Classification Search
CPC ..... G06K 9/62; G06K 9/6282; G06K 9/0063; G06K 9/3233
USPC ......... 382/209, 170, 216, 254; 348/77, 231.3, 348/207.1, 241; 701/4, 6, 102
See application file for complete search history.

(56) References Cited

U.S. PATENT DOCUMENTS

| | | | |
|---|---|---|---|
| 5,574,835 A | 11/1996 | Duluk et al. | |
| 5,734,480 A * | 3/1998 | Kawamura et al. | 358/296 |
| 6,360,020 B1 * | 3/2002 | Panis | 382/253 |
| 6,535,223 B1 | 3/2003 | Foley | |
| 6,587,601 B1 | 7/2003 | Hsu et al. | |
| 6,597,818 B2 * | 7/2003 | Kumar et al. | 382/294 |
| 6,775,412 B1 * | 8/2004 | Nister et al. | 382/243 |
| 6,868,191 B2 * | 3/2005 | Nister | 382/285 |
| 6,952,212 B2 * | 10/2005 | Nister et al. | 345/474 |
| 7,085,425 B2 * | 8/2006 | Christopoulos et al. | 382/243 |
| 7,187,809 B2 * | 3/2007 | Zhao et al. | 382/285 |

(Continued)

FOREIGN PATENT DOCUMENTS

| | | |
|---|---|---|
| CN | 101295323 A | 10/2008 |
| CN | 101763647 A | 6/2010 |
| CN | 101802824 A | 8/2010 |

OTHER PUBLICATIONS

Nister, D.; Stewenius, H.; , "Scalable Recognition with a Vocabulary Tree," Computer Vision and Pattern Recognition, 2006 IEEE Computer Society Conference on , vol. 2, No., pp. 2161-2168, 2006.*

(Continued)

*Primary Examiner* — Stephen R Koziol
*Assistant Examiner* — Shaghayegh Azima
(74) *Attorney, Agent, or Firm* — Steven Spellman; Jim Ross; Micky Minhas

(57) ABSTRACT

An image matching system is described for finding reference images that match a query image. The image matching system performs this operation in expeditious fashion by restricting the matching to a bounding region; the bounding region, in turn, may be associated with a location at which the query image may have been captured. In addition, the image matching system provides various mechanisms that expedite adding new reference images to an image index, to thereby provide a re-enforced learning mechanism of the image matching system.

24 Claims, 14 Drawing Sheets

(56) References Cited

U.S. PATENT DOCUMENTS

| | | | |
|---|---|---|---|
| 7,271,827 B2* | 9/2007 | Nister | 348/169 |
| 7,324,686 B2* | 1/2008 | Nister | 382/154 |
| 7,359,526 B2* | 4/2008 | Nister | 382/100 |
| 7,466,244 B2* | 12/2008 | Kimchi et al. | 340/995.1 |
| 7,522,186 B2* | 4/2009 | Arpa et al. | 348/153 |
| 7,613,323 B2* | 11/2009 | Nister et al. | 382/103 |
| 7,643,673 B2 | 1/2010 | Rohlf et al. | |
| 7,725,484 B2* | 5/2010 | Nister et al. | 707/763 |
| 8,189,925 B2* | 5/2012 | Kroepfl et al. | 382/216 |
| 8,194,993 B1* | 6/2012 | Chen et al. | 382/254 |
| 8,254,697 B2* | 8/2012 | Isard et al. | 382/209 |
| 2001/0031005 A1* | 10/2001 | Nister et al. | 375/240.16 |
| 2002/0015048 A1* | 2/2002 | Nister | 345/625 |
| 2002/0026310 A1* | 2/2002 | Mochida et al. | 704/201 |
| 2003/0085992 A1* | 5/2003 | Arpa et al. | 348/47 |
| 2003/0206652 A1* | 11/2003 | Nister | 382/154 |
| 2004/0008264 A1* | 1/2004 | Nister | 348/207.99 |
| 2004/0013400 A1* | 1/2004 | Chikazawa | 386/46 |
| 2004/0096097 A1* | 5/2004 | Nister | 382/154 |
| 2004/0179720 A1* | 9/2004 | Chen et al. | 382/118 |
| 2004/0221226 A1* | 11/2004 | Lin et al. | 715/501.1 |
| 2004/0227820 A1* | 11/2004 | Nister | 348/207.99 |
| 2004/0234141 A1* | 11/2004 | Christopoulos et al. | 382/233 |
| 2004/0264794 A1* | 12/2004 | Nister et al. | 382/243 |
| 2005/0008231 A1* | 1/2005 | Christopoulos et al. | 382/232 |
| 2005/0271290 A1* | 12/2005 | Nister et al. | 382/240 |
| 2005/0286516 A1* | 12/2005 | Sundaresan et al. | 370/389 |
| 2006/0013437 A1* | 1/2006 | Nister et al. | 382/103 |
| 2006/0095540 A1 | 5/2006 | Anderson et al. | |
| 2006/0215923 A1* | 9/2006 | Beatty | 382/253 |
| 2006/0238383 A1 | 10/2006 | Kimchi et al. | |
| 2007/0031064 A1* | 2/2007 | Zhao et al. | 382/285 |
| 2007/0050340 A1 | 3/2007 | Von Kaenel et al. | |
| 2007/0110338 A1 | 5/2007 | Snavely et al. | |
| 2007/0115373 A1* | 5/2007 | Gallagher et al. | 348/231.3 |
| 2007/0214172 A1* | 9/2007 | Nister et al. | 707/102 |
| 2007/0288141 A1* | 12/2007 | Bergen et al. | 701/38 |
| 2008/0243573 A1 | 10/2008 | Nasser et al. | |
| 2008/0253405 A1* | 10/2008 | Ng et al. | 370/506 |
| 2008/0273795 A1* | 11/2008 | Ofek et al. | 382/170 |
| 2008/0301133 A1* | 12/2008 | Brown et al. | 707/6 |
| 2009/0008450 A1 | 1/2009 | Ebert et al. | |
| 2009/0031175 A1* | 1/2009 | Aggarwal et al. | 714/47 |
| 2009/0083237 A1* | 3/2009 | Gelfand et al. | 707/4 |
| 2009/0167763 A1* | 7/2009 | Waechter et al. | 345/426 |
| 2009/0213249 A1* | 8/2009 | Ikeda | 348/241 |
| 2009/0237508 A1* | 9/2009 | Arpa et al. | 348/153 |
| 2009/0307255 A1 | 12/2009 | Park | |
| 2009/0313239 A1* | 12/2009 | Wen et al. | 707/5 |
| 2010/0046842 A1* | 2/2010 | Conwell | 382/218 |
| 2010/0048242 A1* | 2/2010 | Rhoads et al. | 455/556.1 |
| 2010/0080470 A1 | 4/2010 | Deluca et al. | |
| 2010/0235356 A1 | 9/2010 | Wexler et al. | |
| 2010/0310182 A1 | 12/2010 | Kroepfl et al. | |
| 2010/0325117 A1* | 12/2010 | Sharma | 707/753 |
| 2011/0052045 A1* | 3/2011 | Kameyama | 382/154 |
| 2011/0085697 A1* | 4/2011 | Clippard et al. | 382/100 |
| 2011/0090337 A1* | 4/2011 | Klomp et al. | 348/144 |
| 2011/0106782 A1* | 5/2011 | Ke et al. | 707/706 |
| 2011/0135207 A1* | 6/2011 | Flynn et al. | 382/209 |
| 2011/0150324 A1* | 6/2011 | Ngan et al. | 382/159 |
| 2011/0173565 A1 | 7/2011 | Ofek et al. | |
| 2011/0221664 A1* | 9/2011 | Chen et al. | 345/156 |
| 2011/0286660 A1 | 11/2011 | Ofek et al. | |
| 2011/0310981 A1* | 12/2011 | Narasimhan | 375/240.26 |
| 2011/0320116 A1* | 12/2011 | DeMaio et al. | 701/201 |
| 2012/0075482 A1* | 3/2012 | Voss et al. | 348/207.1 |
| 2012/0086792 A1* | 4/2012 | Akbarzadeh et al. | 348/77 |
| 2012/0133529 A1* | 5/2012 | He | 340/977 |
| 2012/0155778 A1* | 6/2012 | Buchmueller et al. | 382/209 |
| 2013/0063613 A1* | 3/2013 | Conwell | 348/207.99 |
| 2013/0132236 A1* | 5/2013 | Gokturk et al. | 705/26.61 |

OTHER PUBLICATIONS

Yan Ke.;Rahul Sukthankar.;Larry Huston.;, "Efficient NearduplicateDetection and SubimageRetrieval,",Intel Research Pittsburgh;,School of Computer Science Carnegie Mellon University, MM'04, Oct. 10-16, 2004, New York, New York, USA.*

Chen, D.M.; Tsai, S.S.; Chandrasekhar, V.; Takacs, G.; Singh, J.; Girod, B.; , "Tree Histogram Coding for Mobile Image Matching," Data Compression Conference, 2009. DCC '09. , vol., No., pp. 143-152, Mar. 16-18, 2009.*

Jing, et al., "Comparison of Clustering Approaches for Summarizing Large Populations of Images," retrieved at <<http://static.googleusercontent.com/external_content/untrusted_dlcp/www.google.com/research/pubs/archive/36270.pdf, Proceedings of the 2010 IEEE International Conference on Multimedia and Expo, Jul. 2010, 5 pages.

Lardinois, Frederic, "Google Image Swirl Brings the Wonder Wheel to Photo Search," retrieved at <<http://www.readwriteweb.com/archives/google_image_swirl_wonder_wheel_for_photos.php>>, ReadWriteWeb, Nov. 17, 2009, 2 pages.

Lin, et al., "Web Image Retrieval Re-Ranking with Relevance Model," retrieved at http://citeseerx.ist.psu.edu/viewdoc/download-?doi=10.1.1.4.5614&rep=rep1&type=pdf, International Conference on Web Intelligence, Oct. 2003, 7 pages.

Reddy, et al., "Image Retrieval by Semantic Indexing," retrieved at <<http://www.jatit.org/volumes/research-papers/Vol5No6/13Vol5No6.pdf>>, Journal of Theoretical and Applied Information Technology, vol. 5, No. 6, Jun. 2009, pp. 745-750.

Forstner, et al., "Online Geocoding and Evaluation of Large Scale Imagery without GPS," retrieved at http://www.ifp.uni-stuttgart.de/publications/phowo07/260Foerstner.pdf, Photogrammetric Week, 2007, pp. 243-253.

Kroepfl, et al., "Efficiently Locating Photographs in Many Panoramas," Proceedings of the 18th SIGSPATIAL International Conference on Advances in Geographic Information Systems, retrieved at http://acm.org>>, Nov. 2010, pp. 119-128.

Nister, et al., "Scalable Recognition with a Vocabulary Tree," IEEE Computer Society Conference on Computer Vision and Pattern Recognition, 2006, 8 pages.

"What is Photosynth?—About—Photosynth," retrieved at <<http://photosynth.net/about.aspx>>, retrieved on Oct. 13, 2010, Microsoft Corporation, Redmond, Washington, 1 page.

"Bing Maps," retrieved at <<http://en.wikipedia.org/wiki/Bing_Maps#StreetSide_View, retrieved on Oct. 13, 2010, Wikipedia.org entry, 25 pages.

"Photosynth," retrieved at <<http://en.wikipedia.org/wiki/Photosynth, retrieved on Oct. 13, 2010, Wikipedia.org entry, 4 pages.

"Google Maps ," retrieved at http://en.wikipedia.org/wiki/Google_Maps, retrieved on Oct. 13, 2010, Wikipedia entry, 19 pages.

"Google Goggles," retrieved at <<http://en.wikipedia.org/wiki/Google_Goggles, retrieved on Oct. 13, 2010, Wikipedia entry, 2 pages.

O'Grady, Jason D., "Amazon Remembers, a brilliant iPhone companion," retrieved at http://webcache.googleusercontent.com/search?g=cache:hw7pBlEfbaUJ:www.zdnet.com/blog/apple/amazon-remembers-a-brillian-iphone-companion/2697+amazon30 remembers&cd=6&hl=en&ct=cInk&gl=us, ZDNet, Dec. 31, 2008, 3 pages.

Hardawar, Devindra, "Bing on the iPhone lets you search friends' updates, adds 'visual scanning'," retrieved at http://venturebeat.com/2010/06/22/microsofts-bing-iphone-app-gets-social-and-camera-search-features/, VentureBeat, Jun. 22, 2010, 7 pages.

Tudor, Greg., "ArcSDE (Enterprise) Database Administration: Configuration, Storage, Tuning, Monitoring, Management and Maintenance", 22 pages, esri.com, Olympia, WA.

Hart, Q. J., "GeoStreams: An Online Geospatial Image Database", 146 pages, Dec. 2006, UC Davis, CA.

Li et al., "From Digital Map to Spatial Information Multi-Grid", Geoscience and Remote Sensing Symposium, Sep. 2004, pp. 2933-2936, vol. 5 IGARSS '04. Proceedings, 2004 IEEE International (vol. 5), Anchorage, AK, http://ieeexplore.ieee.org/stamp/stamp.jsp?arnumber=01370309.

(56) References Cited

OTHER PUBLICATIONS

"Autodesk Geospatial Product Line", autodesk.com.
"Airborne Thermal Infrared Remote Sensing, Coeur d' Alene River, Idaho", Dec. 3, 2007, 26 pages., Watershed Sciences, Inc., Corvallis, OR.
State Intellectual Property Office (SIPO), "First Office Action and Search Report Issued in Corresponding Chinese Patent Application No. 201110423053.0", Office Action, Jan. 6, 2014, 9 pages, China.
State Intellectual Property Office (SIPO), "Second Office Action and Search Report Issued in Chinese Patent Application No. 201110423053.0", Office Action, Sep. 15, 2014, 13 pages, China.

* cited by examiner

US 8,971,641 B2

SPATIAL IMAGE INDEX AND ASSOCIATED UPDATING FUNCTIONALITY

BACKGROUND

Technology presently exists for matching a query image against a corpus of reference images. In one example, this approach may be conceptualized as including an index creation (and index updating) phase and a search phase. In the index creation phase, such a system extracts image features from the reference images. The system then creates (or updates) an inverted index which maps the image features to reference images which contain those features. In a search phase, the system can extract image features from a query image. The system can then use those query features, together with the index, to find one or more reference images which may be similar to the query image.

The above-described operations are complex and time-consuming to perform. This negatively affects the responsiveness of both the index creation phase and search phase of such a system. This issue, in turn, reduces the utility of such an image matching system for reasons set forth herein.

SUMMARY

An image matching system is described herein for matching a query image against a collection of reference images. According to one illustrative feature, the image matching system receives a query image together with location information associated with the query image. For example, the location information may correspond to a geographic location at which the query image was captured. The image matching system then identifies a bounding region that is associated with the location information. The image matching system then performs image matching by comparing the reference image with only those reference images that reside within the bounding region. This aspect helps reduce the complexity of processing during a search phase of processing provided by the image matching system, making the search phase more responsive and potentially more accurate. That is, by contrast, an exhaustive search of all reference images (without reference to location) would take longer, and would therefore reduce the speed and consequent utility of a search operation.

According to another illustrative feature, the image matching system first identifies a set of candidate reference images which may match the query image, e.g., by converting the query image into a set of quantized features and then using an inverted index to identify reference images that match those quantized features. The image matching system then uses verification analysis to identify one or more final matching images, selected from among the set of candidate reference images.

According to another illustrative feature, the image matching system can also collect orientation information that pertains to the orientation of a device that captured the query image. The image matching system can use the orientation information to refine its analysis (e.g., in the course of performing verification analysis).

According to another illustrative feature, the image matching system can update the index to include image information entries associated with final matching images. That is, the final matching images may correspond to query images that have been determined to match respective reference images, thus providing a type of feedback loop whereby search results are fed back to a collection of reference images. This provides a re-enforced learning mechanism.

According to another illustrative feature, the updating of the index can be performed in near real-time. From a functional perspective, for example, assume that a user captures two consecutive query images in quick succession, e.g., within a short time of each other. The image matching system updates the index based on the first query image (if it matches a reference image) prior to submission of the second query image, so that the first query image is made available as a reference image prior to the submission of the second query image. In one particular illustrative implementation, updating occurs in less than one minute. The near real-time updating enables various new applications of the image matching system, to be set forth below.

According to another illustrative feature, updating management functionality is described which carries out the above-described near real-time updating. For instance, the updating operation may entail transferring reduced-size bucket sets of image information entries to index servers for updating. The use of reduced-size bucket sets allows the index servers to integrate the new entries in an expeditious fashion.

According to another illustrative feature, the updating management functionality can distribute image information entries across index servers, such that two consecutively-captured query images may be allocated to different index servers. For reasons set forth in greater detail below, this feature may help distribute processing burden across plural index servers during a search phase of the operation.

According to another feature, the updating management functionality can also forward each image information entry to a temporary index server. The index information stored by this temporary index server is then immediately available for use in performing a search. The updating management functionality can remove an image information entry stored in the temporary index server after a predetermined amount of time has elapsed (since, by this time, non-temporary index server(s) are presumed to have received the image information entry).

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative image matching system for matching query images with reference images, and then incorporating new reference images into an indexing system. The image matching system performs these operations in an expeditious manner. Section B describes illustrative methods which explain the operation of the image matching system of Section A. Section C describes illustrative processing functionality that can be used to implement any aspect of the features described in Sections A and B.

Figure 16:
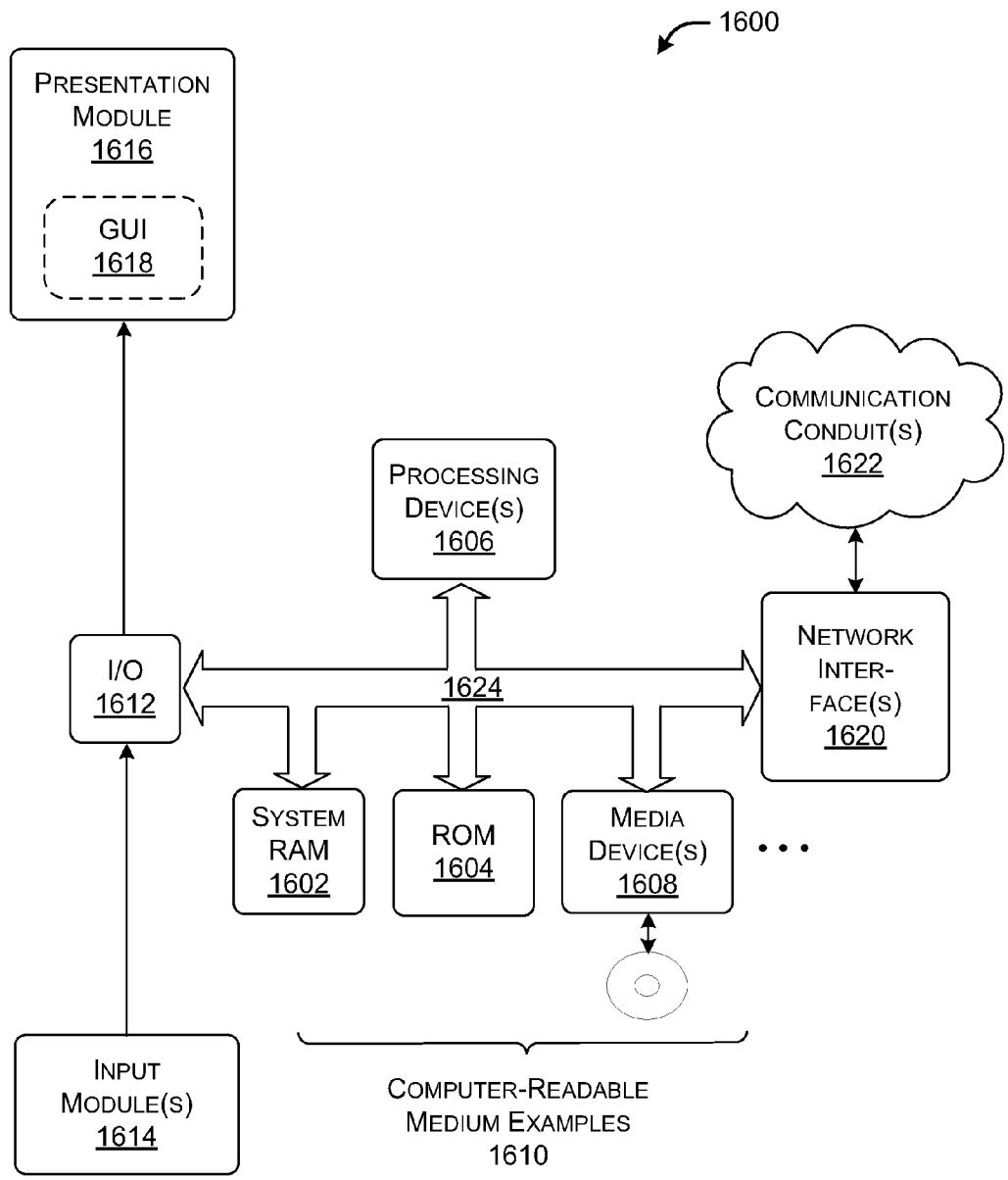
FIG. 16 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (e.g., using hardware, software, firmware, etc., or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 16, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (e.g., using hardware, software, firmware, etc., or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not to be interpreted as an exhaustive indication of features that can be duplicated. Finally, the terms "exemplary" or "illustrative" refer to one implementation among potentially many implementations.

A. Illustrative Image Matching System

Figure 1:
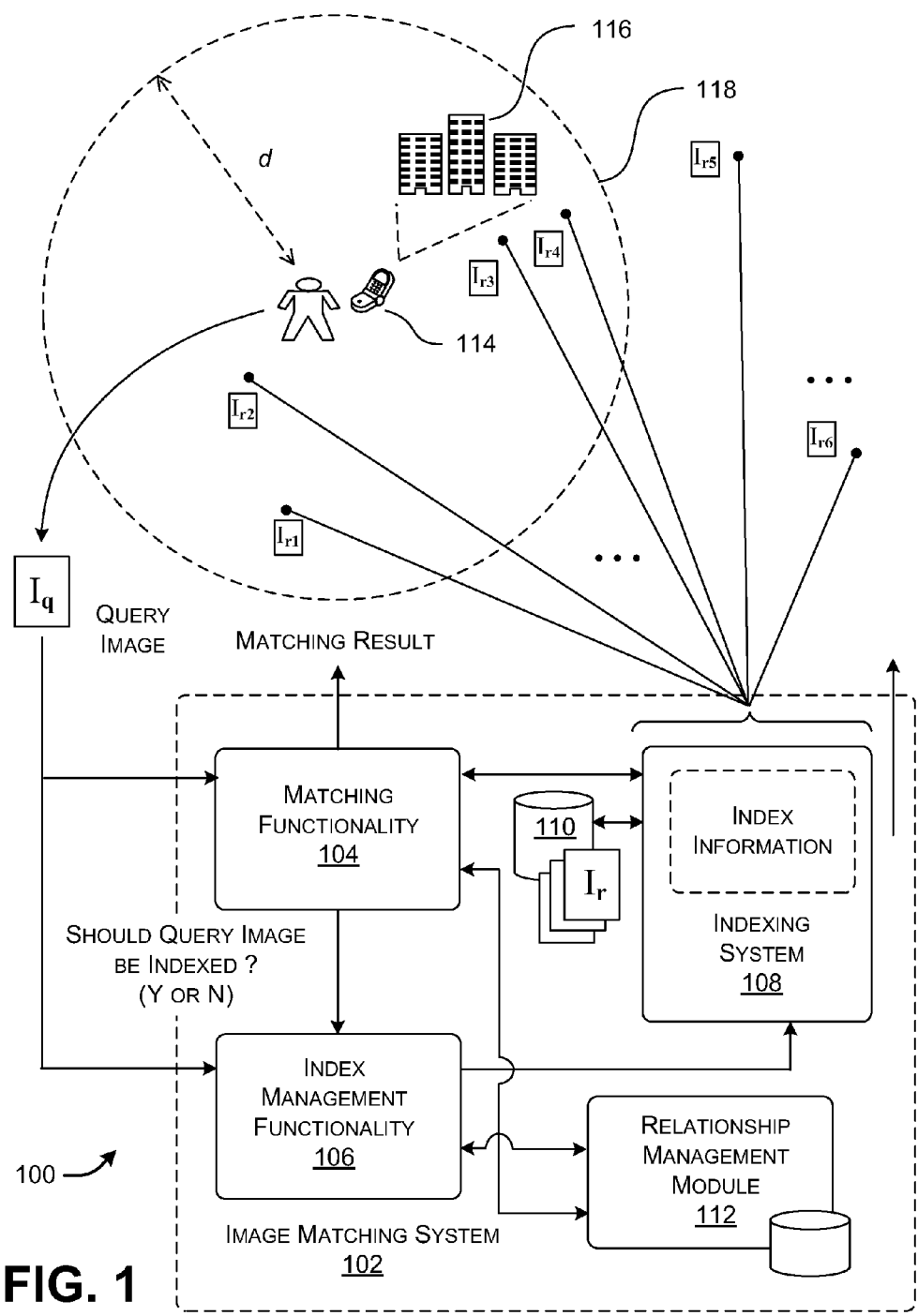
FIG. 1 shows an illustrative environment in which an image matching system can match query images against a collection of reference images.

FIG. 1 shows an illustrative environment 100 that includes an image matching system 102. In this section, FIG. 1 will be used as a vehicle for setting forth an overview of selected properties of the image matching system 102. Later figures and accompanying description will set forth the operation of individual modules within the image matching system 102 in greater detail.

From a high-level standpoint, the image matching system 102 includes matching functionality 104 and index management functionality 106. The matching functionality 104 operates by matching a query image ($I_q$) against a collection of reference images (e.g., $I_{r1}$, $I_{r2}$, . . . ), to thereby find one or more reference images that are deemed similar to the query image ($I_q$). In performing this function, the matching functionality 104 relies on an indexing system 108. The indexing system 108 maintains image information that pertains to the reference images. One or more data stores (e.g., data store 110) may store the reference images themselves.

Presume that the matching functionality 104 identifies that the query image (taken at time instance t1) matches a particular reference image. In one implementation, the index management functionality 106 then operates to add an image information entry (corresponding to the reference image) to the indexing system 108. This enables a subsequent query image (taken at time instance t2) to potentially match the previous query image (taken at time instance t1).

In addition, a relationship management module 112 can maintain and update relationship information which indicates the relations among reference images. In one manner of use, the image matching system 102 can conclude that the query image is related to one or more existing reference images. Based on this conclusion, in response to an instruction from the index management functionality 106, the relationship management module 112 can update its relationship information to include the new connections established by the image matching system 102.

FIG. 1 also illustrates a scenario that sets forth one way in which the image matching system 102 may operate. In this scenario, a user may use a mobile computing device 114 to capture the query image ($I_q$). For example, the mobile computing device 114 may correspond to a handheld mobile telephone device, a camera, or any other processing device that includes image capture functionality. In this particular scenario, assume that the user uses the mobile computing device 114 to take a picture of a building 116 within a particular city.

The image matching system 102 can also be applied in other contexts. Generally, the image matching system 102 can be applied to any scenario in which a user uses any computing device (including even a stationary computing device) to perform an image search based on any type of query image obtained from any source(s), and based on any corpus of reference images provided by any source(s). The image matching system 102 can also interact with non-human agents of any type. For example, a functional module within any type of system can automatically identify and present query images to process for any environment-specific reason. However, to facilitate description, it will be assumed in the following description that the entity which presents queries is a human user.

In one case, the mobile computing device 114 can use local and/or remote position determination mechanism (not shown) to determine location information. The location information describes a location (L) at which the user captures the query image. The location (L) may also generally correspond to the location of an object represented by the image. Generally, the location information can convey a position (or positions), and, optionally, a level of accuracy of that position (or positions).

The mobile computing device 114 can use GPS technology, or Wi-Fi location technology, or cell tower triangulation technology, or any other position-determination technology (or combination thereof) to determine the location at which the user captures the query image. In the above-described scenario shown in FIG. 1, the location information provided thereby will indicate, with some margin of error, that the user is located in a particular region of a particular city (where different location-determination techniques have different respective levels of accuracy). In addition, or alternatively, a user (or any other agent) can expressly apply a location tag to a previously captured image which conveys a location associated with the image. That location tag constitutes location information. In one implementation, a user can expressly opt in to (or opt out of) the collection of location information. If collected, the image matching system 102 can provide security provisions to maintain the confidence of the location information.

The mobile computing device 114 can also capture orientation information. The orientation information describes the orientation (O) of the mobile computing device 114 at the time that the query image is captured. For example, the mobile computing device 114 can rely on gyroscope technology, accelerometer technology, etc. (or any combination thereof) to capture the orientation of the mobile computing device 114. In addition, or alternatively, a user (or any other agent) can expressly apply an orientation tag to a previously captured image which indicates an orientation associated with the image. That orientation tag constitutes orientation information. In any case, the orientation information can have any number of dimensions. In one case, the orientation information has a single degree of freedom that corresponds to a roll angle about an optical axis of the camera. In other cases, the orientation information can describe any combination of roll, pitch, and yaw degrees of freedom.

As will be set forth shortly in greater detail, the index matching system 102 can use a two-phase approach to identify reference images that match the query image. In a first phase, the image matching system 102 generates a set of candidate reference images which may have similar content to the query image. It performs this task by using the indexing system 108 to map quantized image features to potentially relevant reference images. In the second phase, the image matching system 102 then uses verification analysis to select one or more final matching images from the set of candidate reference images. It performs this task by performing pairwise comparison of the query image which each candidate reference image (identified in the first phase). In doing so, the verification analysis can cull out one or more candidate reference images that do not match the query image with a suitable degree of confidence.

In performing the first phase of its operation, the image matching system 102 can identify a bounding region 118 that is associated with the location (L). For example, in one implementation, the image matching system 102 can identify a circular bounding region 118 having the user's presumed current location as its center point. A radius (d) of the bounding region 118 defines the spatial extent of the bounding region 118. This is merely one example; in other implementations, the image matching system 102 can define a bounding region having any other shape. Further, the user and/or any other authorized agent can set the radius d to any value that is deemed appropriate to achieve the objectives of a particular application in a particular environment.

After defining the bounding region 118, the image matching system 102 restricts its image searching operating to a subset of images that are associated with the bounding region 118. For example, these reference images may correspond to images that were captured at locations within the bounding region 118, and/or images that were subsequently associated with locations within the bounding region 118. For example, consider the example of FIG. 1. Assume that images $I_{r1}$, $I_{r2}$, $I_{r3}$, and $I_{r4}$ are associated with the bounding region 118. Assume that at least images $I_{r5}$ and $I_{r6}$ are associated with locations that lie outside the bounding region 118. (In actuality, there may be many more reference images inside and outside the bounding region 118.) In this illustrative scenario, the image matching system 102 proceeds by comparing the query image ($I_q$) with images $I_{r1}$, $I_{r2}$, $I_{r3}$, and $I_{r4}$, but not with images $L_{r5}$ and $I_{r6}$.

To perform the above-described operations, each reference image is tagged with location information (if such location information exists), along with other metadata. The indexing system 108 maintains such location information, along with other metadata. The image matching system 102 can then take the location of the reference images into account before it matches the query image against the reference images. As such, in one implementation, the location information allows the image matching system 102 to perform an initial filtering operation on the corpus of reference images.

The above use of location information (performed in the first phase of the search operation) may be referred to as location-based scoping. The location-based scoping has at least two potential benefits. First, it may improve the quality of the image matching operation, since it eliminates from consideration those reference images that are unlikely to reliably match the query image. For example, an image captured in San Francisco is unlikely to match an image captured in San Antonio. Second, the location-based scoping may expedite the image matching operation, since the image matching system 102 is comparing the query image against only a subset of a much larger corpus of reference images.

In the second phase, the image matching system 102 can perform verification analysis to identify final matching images, selected from among the set of candidate reference images. In this stage, the image matching system 102 can use the orientation information to improve its pair-wise comparison of the query image with individual reference images.

However, in other scenarios and implementations, the image matching system 102 can eliminate the use of location-based scoping and/or orientation-based processing. By omitting location-based scoping, for example, the image matching system 102 can perform matching over the entire set of reference images represented in the indexing system 108.

Figure 2:
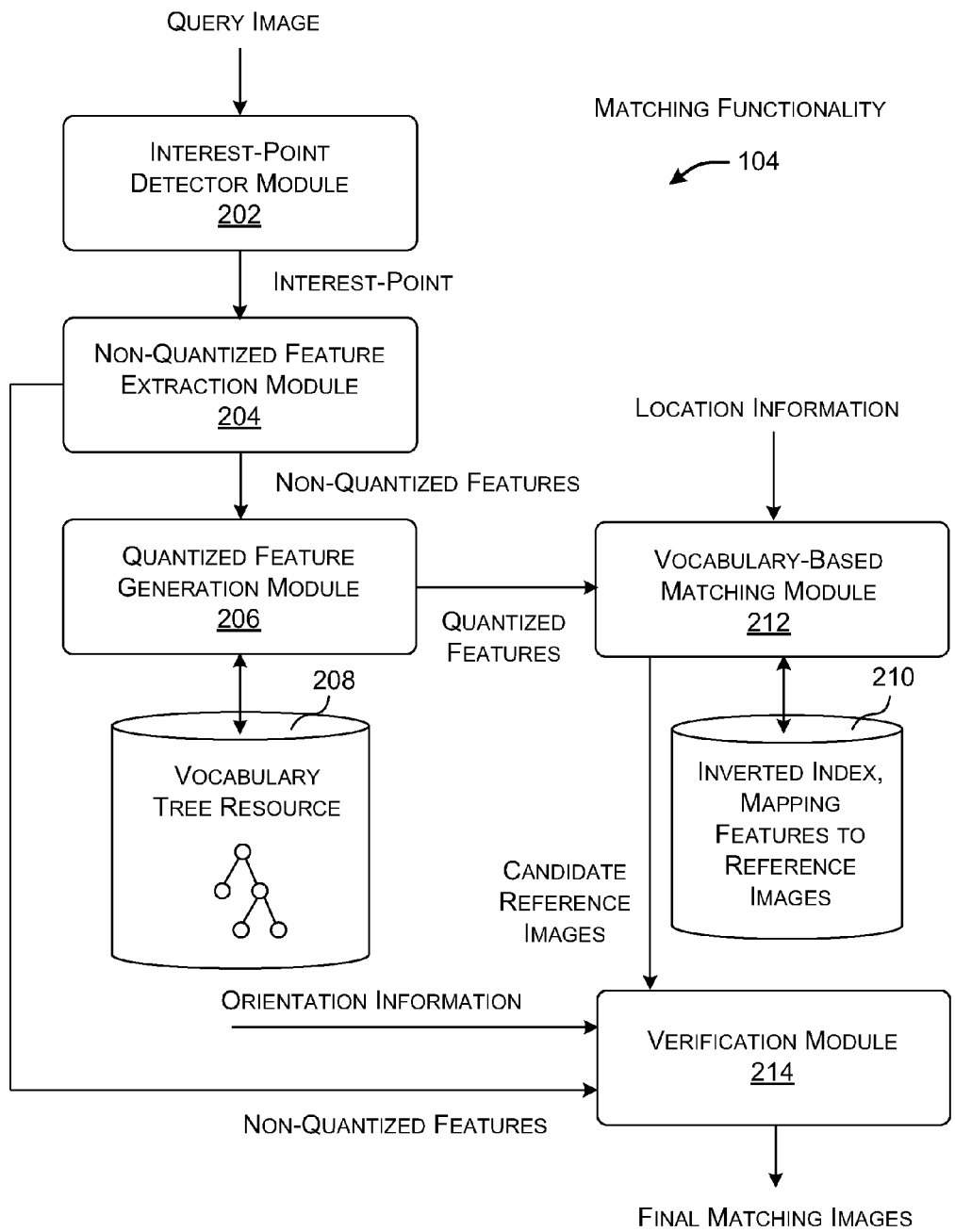
FIG. 2 shows matching functionality that can be used in the environment of FIG. 1. The matching functionality matches query images with reference images.

FIG. 2 shows one implementation of the matching functionality 104 of FIG. 1. The matching functionality 104 matches a query image against a collection of reference images using image matching algorithms (to be set forth below). These image matching algorithms are set forth by way of illustration, not limitation; that is, other implementations can adopt other algorithms. As a further note, certain aspects of the index management functionality 106 can also incorporate some of the functionality shown in FIG. 2.

Addressing this functionality from top to bottom, the matching functionality 104 first applies an interest-point detector module 202 to the query image. The interest-point detector module 202 identifies points of interest in the query image. For example, the interest-point detector module 202 can identify corners and/or blobs in the query image using any technique, such as by applying a Laplacian interest-point detector, etc.

A non-quantized feature extraction module 204 then identifies image features associated with the interest-points. As used herein, a feature refers to any descriptive information that is used to characterize a part of the image, typically in a more concise and useful form compared to the original raw image content. For example, the non-quantized feature extraction module 204 can identify image patches around each interest-point. The non-quantized image feature extraction module 204 can then apply any feature-extraction technique to represent the image patches as image features. The Scale-Invariant Feature Transform (SIFT) technique is one such approach that can be used to form the image features. SIFT subdivides a square image patch into 4×4 equally sized regions, and then computes for each region a histogram of image gradients. The SIFT technique produces a 128-dimensional image feature for the image region. The image features produced by the non-quantized feature extraction module 204 are referred to as non-quantized image features because their dimensionality (e.g., conciseness) is not yet further reduced in the manner to be described next. In addition, various techniques can optionally be used to reduce the dimensionality of the features prior to subsequent processing of the features, such as the Principal Component Analysis (PCA) technique.

A quantized feature generation module 206 operates on the non-quantized image features to produce quantized image features. In one case, the quantized image features represent the reduction of the non-quantized image features into integer descriptors. One way to perform this reduction is using a vocabulary tree, as described in, for example, David Nistér, et al., "Scalable Recognition with a Vocabulary Tree," *Proceedings of the* 2006 *IEEE Computer Society Conference on Computer Vision and Pattern Recognition,* 2006, pp. 2161-2168. In a set-up phase, a vocabulary tree is produced by successively clustering a corpus of representative non-quantized image features, to produce a hierarchal tree of nodes (representing cluster centers). A data store 208 may store a representation of the vocabulary tree. The vocabulary tree henceforth provides a mapping mechanism for assigning integer numbers to non-quantized image features. The set-up phase also involves creating an inverted index. The inverted index maps possible quantized features to reference images which contain those quantized features. The indexing system 108 (shown in FIG. 1) can store the thus-produced inverted index in a data store 210 (shown in FIG. 2).

In the context of the search operation shown in FIG. 2, the quantized feature generation module 206 uses the vocabulary tree to map the non-quantized features (that have been generated by the non-quantized feature extraction module 204) into quantized features. Again, the quantized features may correspond to integers in one implementation. A vocabulary-based matching module 212 then uses the quantized features (associated with the query image) as lookup information to find a set of potentially relevant reference images. To do so, the vocabulary-based matching module 212 consults the inverted index maintained in the data store 210. In effect, the quantized feature generation module 206 converts the non-quantized image features into "visual words," much like a textual document contains textual words. The vocabulary-based matching module 212 then performs an index-based search of the reference images based on the visual words, e.g., by comparing the visual words in the query image with the visual words in the reference images.

FIG. 2 also indicates that location information feeds into the vocabulary-based matching module 212. This means that the vocabulary-based matching module 212 can optionally perform location-based scoping in the manner described above. That is, instead of comparing the query image with all of the reference images, the vocabulary-based module 212 can compare the query image against only those reference images that are associated with the relevant bounding region 118. Again, it is assumed that the index information maintained by the indexing system 108 provides relevant location information, and that location information represent an extra field that can be matched against.

The output of the vocabulary-based matching operation represents a set of candidate reference images, ranked by a score determined during this operation. The above-described series of operations also corresponds to the above-mentioned first phase of processing.

In the second phase of processing, a verification module 214 performs additional verification analysis to determine whether each of the candidate reference images is indeed a viable match for the query image. The verification module 214 can perform any technique or combination of techniques to perform this operation. In one case, the verification module 214 can perform this operation by making a point-by-point interest-point comparison of the query image with each of the candidate reference images.

In another approach, the verification module 214 can perform verification analysis based on the techniques described in co-pending and commonly assigned U.S. patent application Ser. No. 12/478,569, filed Jun. 4, 2009, entitled "Geocoding by Image Matching," naming the inventors of Michael Kroepfl, et al., and/or U.S. application Ser. No. 12/783,598, filed on May 20, 2010, entitled "Spatially Registering User Photographs," naming the inventors of Eyal Ofek, et al. Both of these applications are incorporated by reference herein in their respective entireties.

For instance, assume that the verification module 214 is in the process of comparing the query image with one particular candidate reference image. It can subdivide the original non-quantized image features associated with the query image into a plurality of orientation bins, e.g., each having 5 degrees of width. The verification module 214 can then match the non-quantized features in each bin with non-quantized features in the reference image which vary from the orientation limits of the bin by no more than a prescribed tolerance r. The orientation information that has been collected can further refine this matching process, e.g., by providing corrective clarification regarding the orientation of the query image with respect to the reference image. Section B provides additional detail regarding the use of the orientation information.

In addition, the verification module 214 can apply a geometric model to map points in the query image to corresponding points in the reference image. For example, the verification module 214 can apply a homography-based model which transforms each point in the query image into a corresponding point in the reference image. In one approach, the known Random Sample Consensus (RANSAC) algorithm can be used to estimate homography. This analysis allows the verification module to cull out reference images which are unlikely to represent valid matches of the query image (e.g., because they do not conform to the geometric model applied by the verification module 214).

In yet a further operation, the verification module 214 can augment the non-quantized features in the query image and the reference image with location information that is gleaned from the homography analysis. For example, the verification module 214 can map non-quantized features in the query image into locations of associated points of interest when projected into the reference image. The non-quantized features in the query image can then be augmented to include location information corresponding to the identified projected locations in the reference image. Additionally, the non-quantized features in the reference image can be augmented based on locations of associated points of interest in the reference image. The verification module 214 can then repeat its matching analysis on the basis of the augmented non-quantized image features.

In one case, the verification module 214 can assign a matching score to each reference image that it analyzes. The matching score identifies a degree of similarity between the query image and the reference image. The verification module 214 can use different approaches to generate such a score. In one case, the matching score corresponds to a number of inliers to the RANSAC operation. Inliers refer to matching interest-points between the query image and the reference image.

In the terminology used herein, the verification module 214 outputs a set of final matching images. The final matching images are those candidate reference images which have been determined to match the query image with a relatively high degree of confidence, e.g., without limitation, in one case, 0.995 or higher. In one application, the use of a high-confidence matching procedure improves the integrity (e.g., accuracy) of relationship information maintained by the relationship management module 112.

Figure 3:
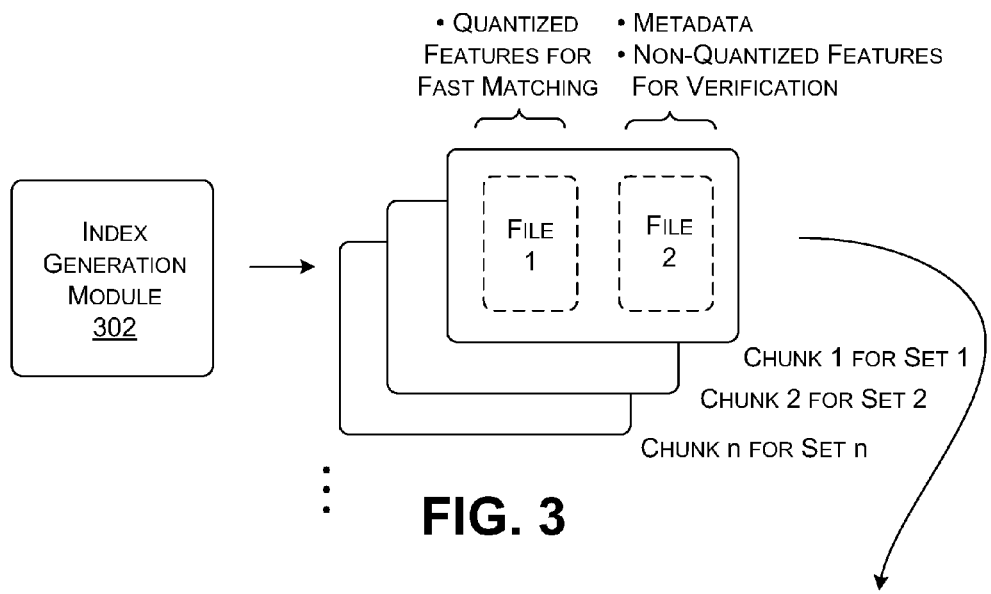
FIG. 3 shows an illustrative index generation module for creating an index that is used to match query images with reference images.

Advancing to FIG. 3, this figure shows an index generation module 302 for creating index information used by the indexing system 108 (of FIG. 1). The index generation module 302 is a component of the index management functionality 106 of FIG. 1. The index generation module 302 may be called on in a bulk index generation mode when it is appropriate to convert a corpus of new reference images into searchable index information.

In one implementation, in the bulk index generation mode, the index generation module 302 applies the non-quantized feature extraction module 204 (of FIG. 2) to generate non-quantized features based on the set of new reference images. The index generation module 302 then uses the quantized feature generation module 206 (of FIG. 2) to generate the quantized features for the set of reference images, e.g., using the vocabulary tree. This collection of information extracted in the above-described process for the set of reference images is referred to as a chunk.

More specifically, in one example, a chunk can include two files. A first file can contain all the quantized features for the reference images for use in performing fast matching in the first stage of processing. A second file can contain the non-quantized images for performing verification analysis. The second file can also include metadata regarding the reference images. The metadata can include tags associated with the reference images. The metadata can also include link information which maps instances of the index information to corresponding reference images themselves (e.g., which may be stored in data store 110). In the terminology used herein, each instance of index information that pertains to a particular reference image is referred to as an image information entry, also referred to as an image signature. The chunk therefore contains a set of the image information entries (e.g., a set of image signatures).

Figure 4:
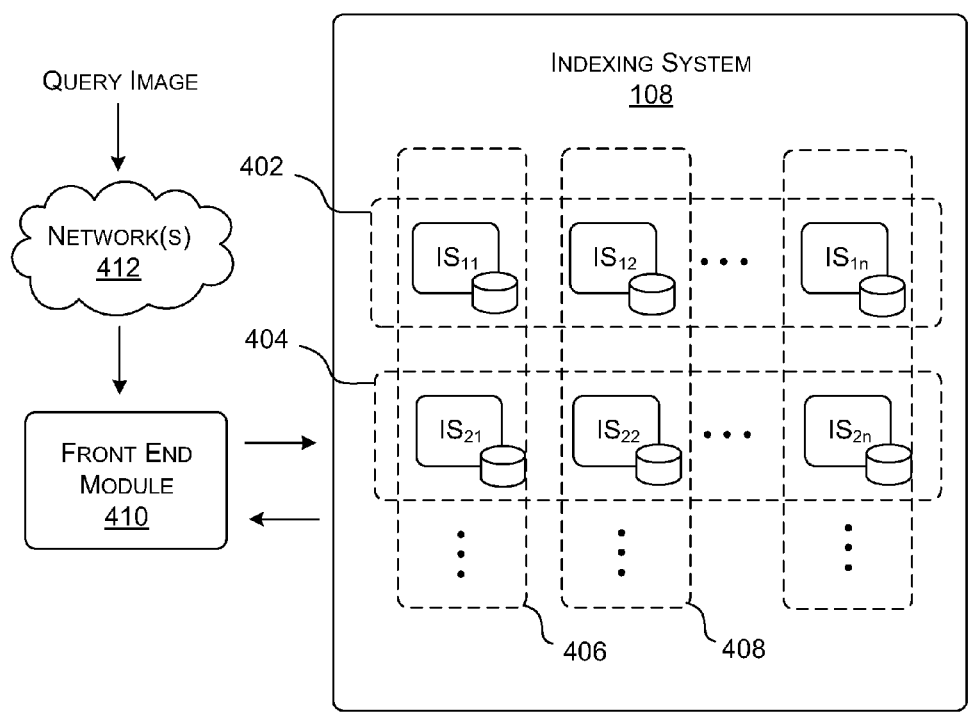
FIG. 4 shows illustrative functionality for performing image matching using the index created by the index creation module of FIG. 3.

FIG. 4 provides additional information regarding one implementation of the indexing system 108. In one case, the indexing system 108 includes a collection of index servers. The collection of index servers, in turn, includes different pools of index servers, such as server pool 402, server pool 404, etc. Each server pool, in turn, may include plural index servers. Each index server within a particular pool includes an identical (redundant) portion (or "slice") of an entire index. Hence, any particular column of index servers (e.g., column 406, 408, etc.) provides a representation of the entire index. This is because the slices provided in a column make up, in aggregate, the entire index.

In the bulk index generation mode, the index generation module 302 can forward a newly created chunk to a particular server pool. The index server(s) in that pool then integrate the newly-received chunk with the index slice that is maintained by that server pool. Alternatively, the index generation module 302 can distribute the image information entries in a chunk to plural index servers using the "spraying" approach to be described shortly.

In a search phase of operation, a front end module 410 receives a query image. It then extracts the non-quantized features (for verification analysis) and the quantized features (for fast index-based vocabulary matching). In the context of FIG. 2, the front end module 410 performs the functions of the interest-point detector module 202, the non-quantized feature extraction module 204, and the quantized feature generation module 206.

The front end module 410 then forwards these features to an index server of each server pool, such as the index servers in a particular column of the indexing system 108. Each index server that is called upon then performs the vocabulary-based matching provided by the vocabulary-based matching module 212 and the verification analysis provided by the verification module 214. The front end module 410 can then receive an indication of the final matching images from the index servers that have been invoked. The front end module 410 can then forward the search results to the user (or other agent) who made the query. In one case, a user can interact with the front end module 410 via a network 412 of any type, such as a local area network, a wide area network (e.g., the Internet), a point-to-point connection, or any combination thereof.

Figure 5:
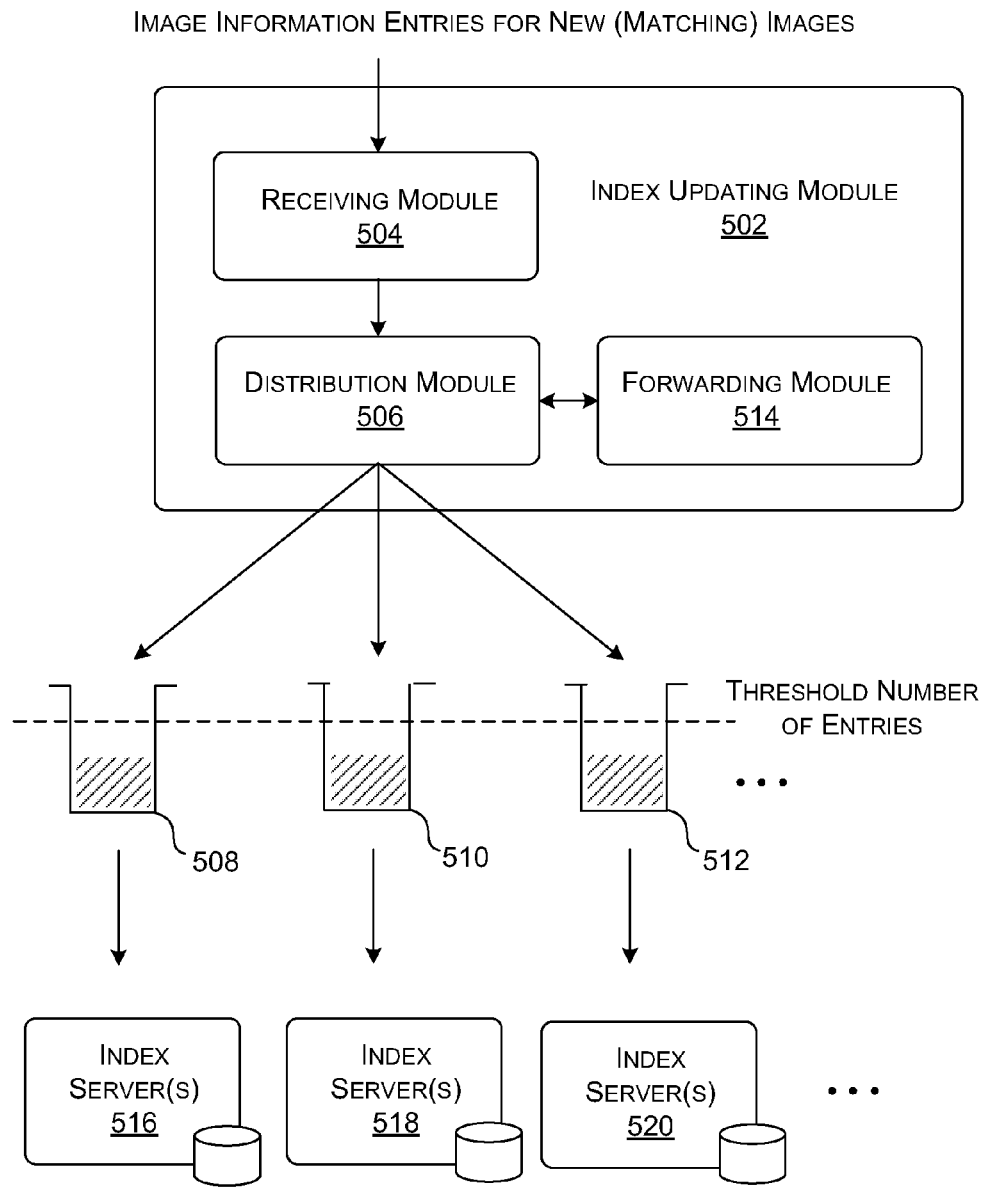
FIG. 5 shows an illustrative index updating module for adding image information entries to the index. The image information entries provide descriptive information corresponding to new reference images to be added to the index.

Advancing to FIG. 5, this figure shows an index updating module 502, which is another component of the index management functionality 106 of FIG. 1. In a real-time index-updating mode, the index updating module 502 adds new reference images to the indexing system 108 based on the query images submitted by users. More specifically, in one implementation, the image matching system 102 is configured to immediately add a query image to the indexing system 108, providing that this query image matches at least one reference image. The former query image then effectively becomes a new reference image. In doing so, the image matching system 102 forms a feedback loop (because query images are integrated into the indexing system 108 after successful matching has been performed).

Assume, in the alternative, that a query image does not match any of the reference images. In one implementation, the image matching system 102 does not add this query image to the indexing system 108. However, other implementations can relax this rule to varying extents. For example, another implementation can add the query image to the indexing system 108 regardless of whether it matches any existing reference image representing by the indexing system 108.

More precisely stated, the index updating module 502 does not add the query image per se to the indexing system 108, but image information pertaining to the query image. As mentioned above, the image information that pertains to a particular query image is referred to as an image information entry. That information can describe the features in the query image, the metadata associated with the query image, and so on. In the real-time index-generating mode, the image matching system 102 has already generated each image information entry to be added to the indexing system 108 (e.g., because this information has been generated for the image when it was previously submitted and processed as a query).

With that introduction, the individual components of FIG. 5 will be described from top to bottom. A receiving module 504 receives the image information entries for a sequence of new images to be added to the indexing system 108. As said, these images can correspond to query images that have been submitted by users.

A distribution module 506 distributes the incoming image information entries to a collection of image buckets (e.g., 508, 510, 512, etc.). The image buckets represent buffers for storing the image information entries until they are forwarded to respective index servers for processing. More specifically, assume that there are three image buckets. The distribution module 506 can "spray" incoming image information entries to the image buckets in round-robin fashion, e.g., such that a first image information entry is sent to image bucket 1, a second image information entry is sent to image bucket 2, a third image information entry is sent to image bucket 3, a fourth image information entry is sent to image bucket 1, and so on. The potential benefit of this manner of processing will be explanation below.

A forwarding module 514 analyzes the accumulating image information entries in the image buckets and determines whether any image bucket reaches a threshold number of entries. If so, the forwarding module 514 can forward the collection of image information entries contained therein to one or more corresponding index servers. More specifically, each image bucket is associated with one or more particular index servers. For example, image bucket 508 is associated with one or more index servers 516, image bucket 510 is associated with one or more index severs 518, and image bucket 512 is associated with one or more index servers 520. Hence, for instance, the forwarding module 514 forwards the image information entries in image bucket 508 to the one or more index servers 516. Upon receiving the image information entries, the index servers then operate on these items to integrate them into their particular slice of index information.

According to one illustrative scenario, an assumption is made that at least some of the image information entries that are consecutively received may correspond to consecutively-captured images. For example, consider the case in which a user is on vacation and takes several pictures of a particular landmark. This suite of pictures can be expected to have similar image content. The distribution module 506 operates by distributing these consecutively-captured images to different image buckets, which, in turn, means that the consecutively-captured images will ultimately be assigned to different index servers.

Next assume that a user later attempts to match a query image that pertains to the same landmark against the reference images represented by the indexing system 108, some of which correspond to the landmark. The front end module 410 of FIG. 4 will route the new query image to a group of index servers that, in aggregate, represent the entire index. Some index servers will identify candidate reference images that match the query image, based on a comparison of the query image with their respective subset of reference images. Some index servers may not find any candidate reference images. Those index servers that do find matches are then tasked with the responsibility of pair-wise comparing the query image with each of the candidate reference images (in the second verification phase), which is a computationally expensive operation. By assigning different landmark-related reference images to different index servers, the functionality shown in FIG. 5 distributes the expensive verification analysis to different index servers in an effective manner.

According to another illustrative feature, the forwarding module 514 can define the threshold number of image information entries that will trigger a forwarding operation so to accommodate quick updating of the index information. The concept of quick updating can be expressed in relative terms as follows. Assume that a user is again taking several pictures of a landmark while on vacation. In one case, the forwarding module 514 performs forwarding at a quick enough pace such that a first query image is added to the indexing system 108 by the time that the user captures and submits a second query image. In one particular implementation, the updating operation can be performed in less than 1 minute. In another implementation, the updating operation can be performed in less than 30 seconds, and so on. These update frequencies are illustrative; other environments can adopt other (larger or smaller) update frequencies. Generally, the forwarding module 514 chooses a threshold number that will induce the desired updating frequency; the speed of updating is increased with decreasing threshold numbers. In one merely representative environment, the forwarding module 514 can set the threshold number at 100 entries.

In the terminology used herein, the index updating module 502 is said to perform near real-time updating. Different usage scenarios are described in Section B that can leverage the near real-time updating.

Figure 6:
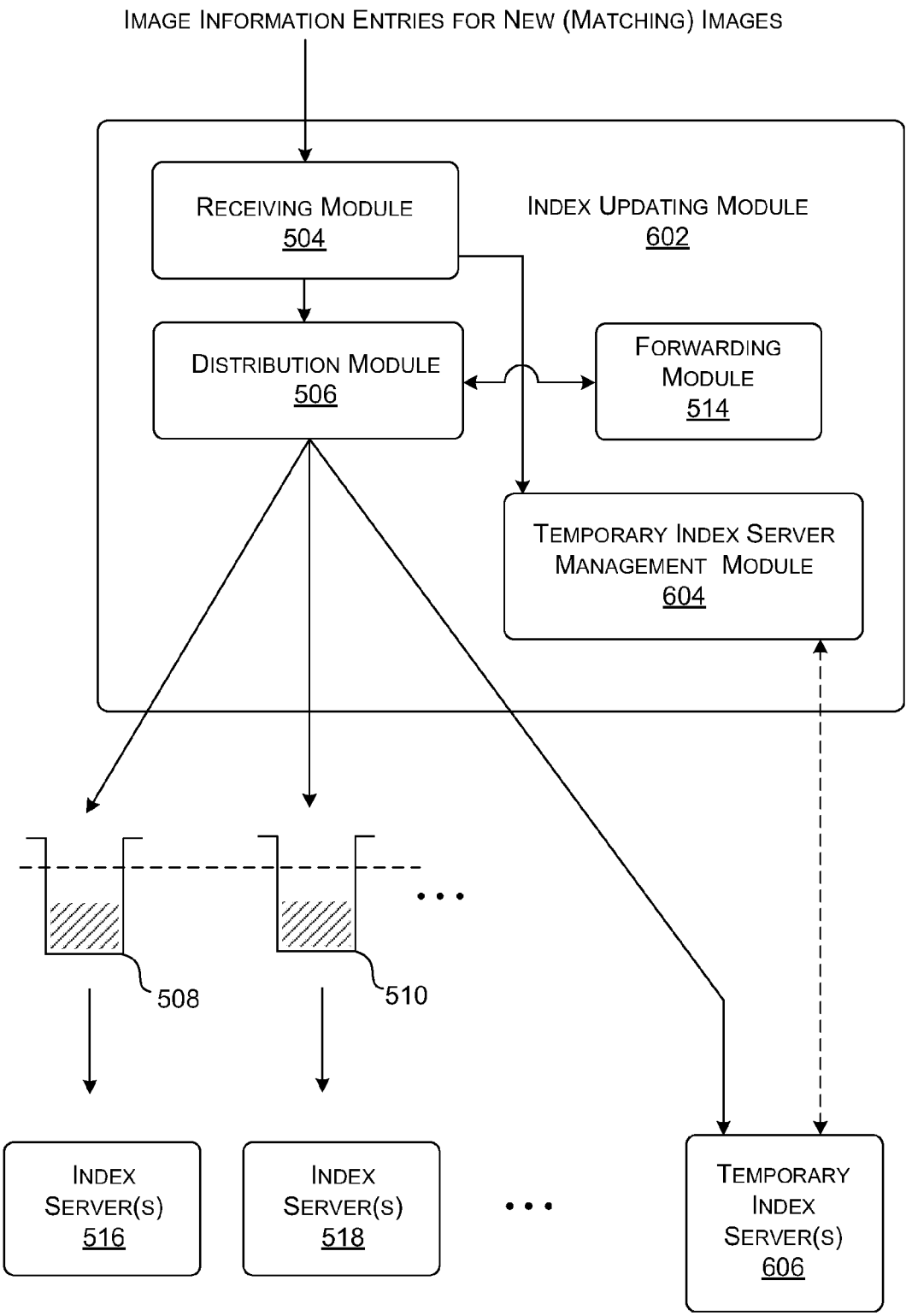
FIG. 6 shows another implementation of the index updating module.

FIG. 6 shows another implementation of the index updating module 602. This version of the functionality operates in the same manner explained above for FIG. 5, with the following exception. In addition to the bucket-based updating mechanism, the receiving module 504 forwards each received image information entry to a temporary index server management module 604. The temporary index server management module 604, in turn, immediately forwards the image information entry to a temporary index server 606.

Then, during a search operation, the front end module 410 fans a search request (based on a query image) to the non-temporary index servers shown in FIG. 4, together with the temporary index server 606 shown in FIG. 6. Each of the invoked index servers compares the query image with the particular reference images that are associated with its particular slice of the entire index. In the case of the temporary index server 606, it compares the query image against a set that represents newly received reference images. Hence, the image matching system 102 can use the temporary index server 606 to very quickly add a new reference image to the index information.

In one implementation, the temporary index server management module 604 can remove image information entries that have been added to the temporary index sever 606 after a prescribed amount of time. This will not jeopardize the availability of image information entries, however, because the same image information entries have presumably trickled down to the non-temporary index servers in the manner described above with respect to FIG. 5. Thus, after the prescribed period of time, the new image information entries may already be represented by the non-temporary index servers.

In one case, the temporary index server 606 performs a search on a query image in the same two-stage manner as any other index server, e.g., by first performing matching based on the quantized features using an inverted index, and then performing pair-wise post-verification based on the non-quantized features. In another implementation, the temporary index server 606 can perform just the secondary pair-wise search over all images represented by the temporary index server 606 that are within the location scope defined by the location information. If this implementation is used, there is no need to create an inverted index (with respect to reference images that are represented by the temporary index server 606). This modification in processing, in turn, may expedite the speed at which new reference images are made available to be searched against (e.g., in one implementation, the images are made available in less than one second). It also streamlines the searching operation itself.

Figure 7:
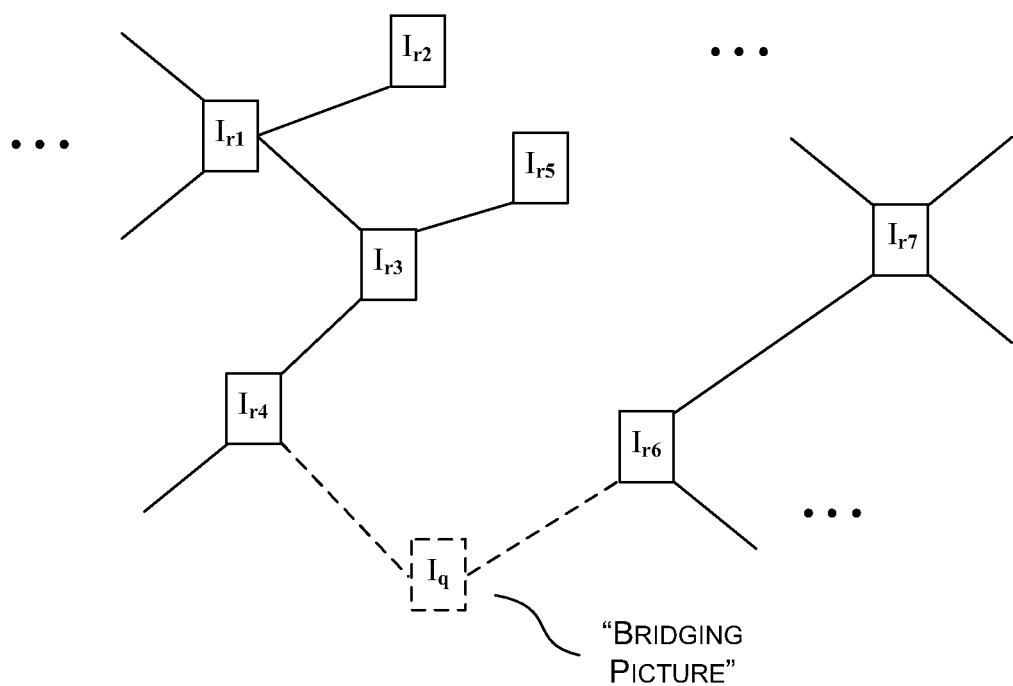
FIG. 7 shows a portion of a data store of related images, as maintained by a relationship management module (as shown in FIG. 1).

FIG. 7 shows a portion of image relationship information maintained by the relationship management module 112 of FIG. 1. The relationship information provides connection information which represents relatedness among the reference images. The relationship management module 112 can obtain information regarding the relatedness of images from various sources. For example, the relationship management module 112 can determine that two or more images are related based on matching analysis performed by the matching functionality 104. In addition, the relationship management module 112 can determine that two or more images are related based on metadata associated with the reference images. For example, the matching functionality 104 may identify that two pictures of Seattle's Fish Market pertain to the same tourist landmark. On top of this analysis, users may annotate the pictures with similar tags, such as "Fish Market," etc. The relationship management module 112 can store these types of relationships in any type of data structure, such as a graph.

The relationship management module 112 can benefit from the near real-time updating in a manner set forth below in the next section.

B. Illustrative Processes

The remaining figures show illustrative procedures and accompanying examples which explain one manner of operation of the image matching system 102 of FIG. 1. Since one manner of operation of the image matching system 102 has already been explained in Section A, certain features will be set forth in summary fashion in this section.

Figure 8:
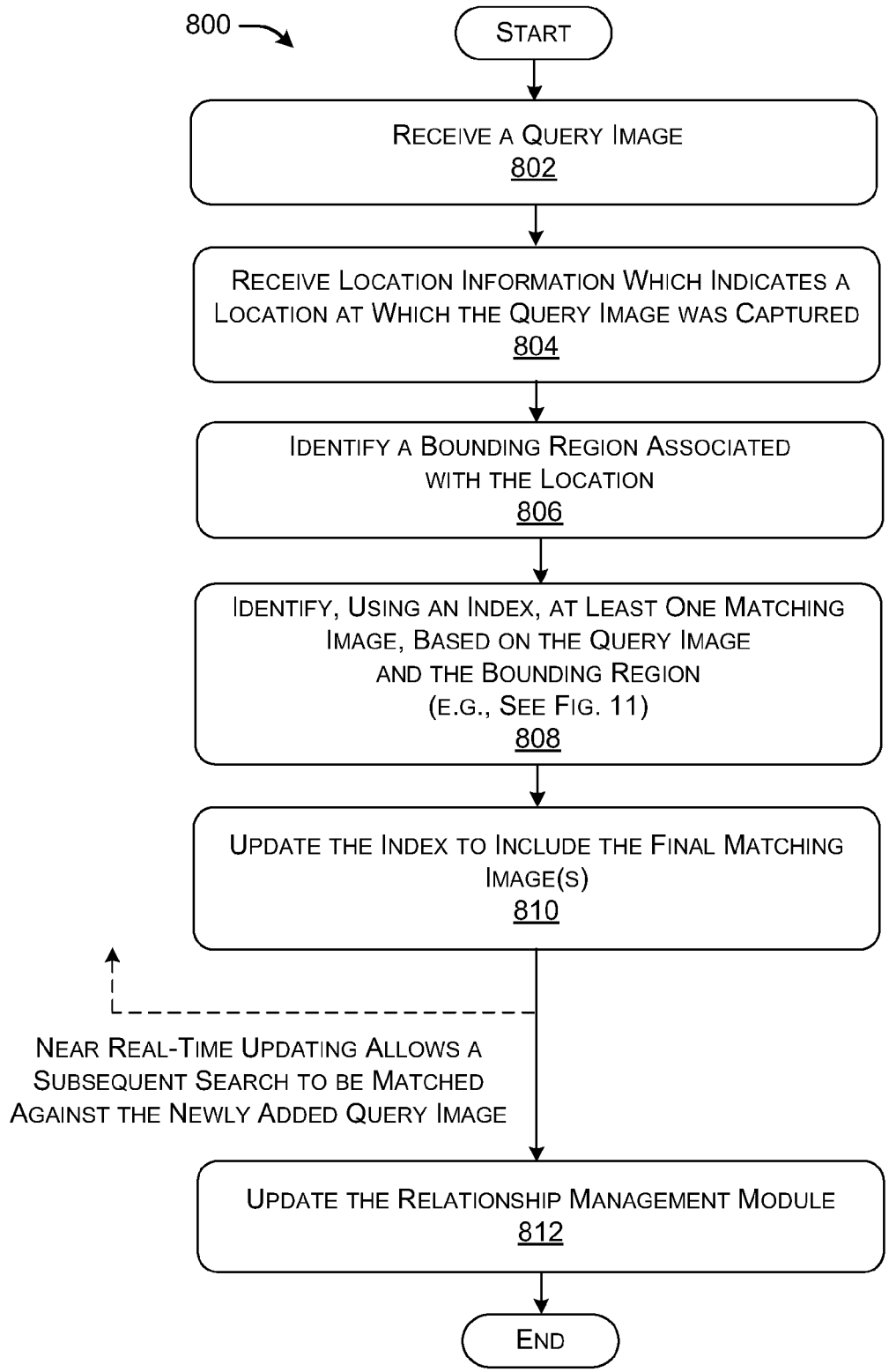
FIG. 8 is a flowchart that shows one illustrative manner of operation of the index matching system of FIG. 1.

Starting with FIG. 8, this figure shows an overview of one manner of operation of the image matching system 102 of FIG. 1. In block 802, the image matching system 102 receives a query image. In block 804, the image matching system 102 receives location information which presumably identifies the location at which the image was captured. This location information can be automatically supplied by a position determination mechanism and/or manually supplied by a user. In block 806, the image matching system 102 identifies a bounding region around the location associated with the query image. Although not described, the image matching system 102 can also receive orientation information which indicates the orientation of the device which captures the query image.

Figure 11:
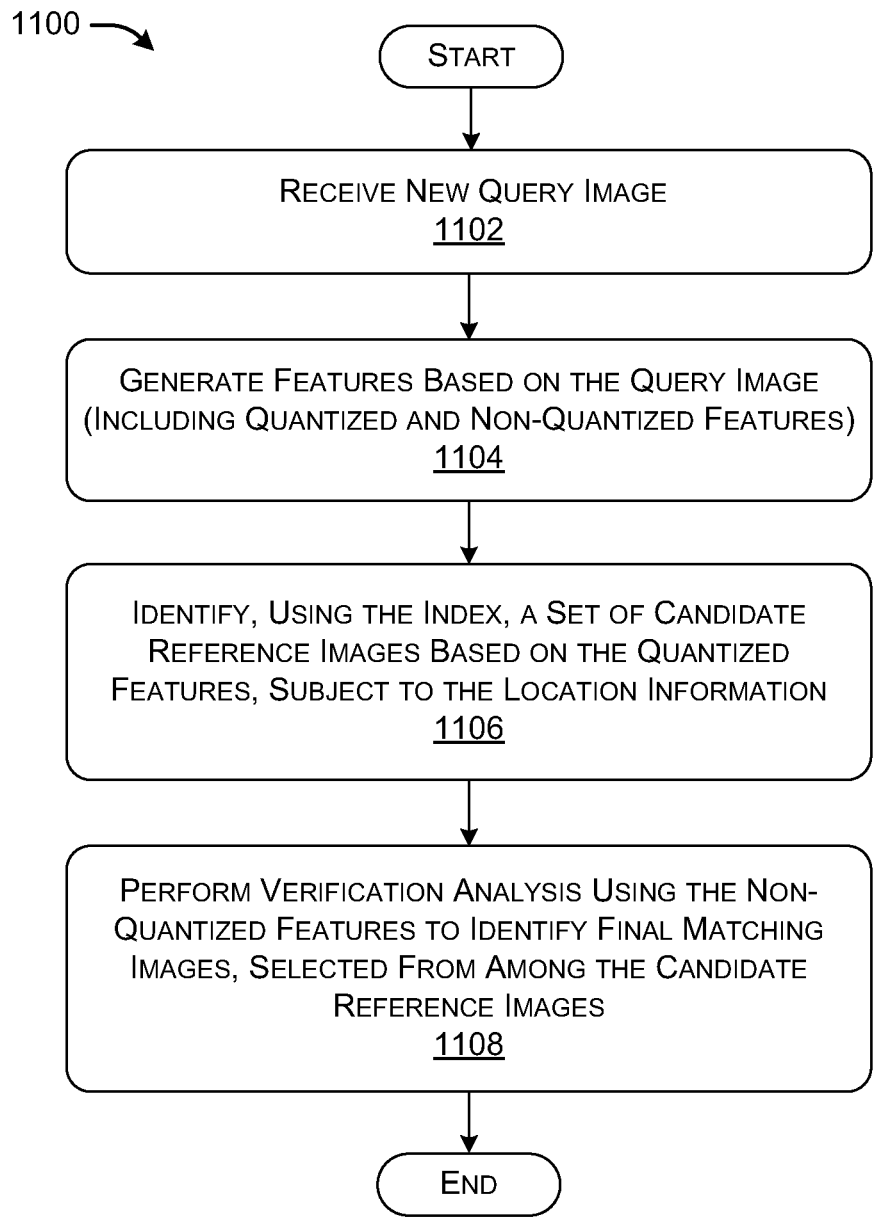
FIG. 11 is a flowchart that shows one illustrative manner of matching query images to reference images using a two-phase approach.

In block 808, the image matching system 102 indentifies at least one final matching image which matches the query image. As explained above, this matching operation can be restricted to a subset of reference images that are associated with the bounding region. FIG. 11 (described below) shows one technique for performing the matching in block 808.

Block 808 culminates in the return of search results to the user. The search results can provide the final matching image(s). In addition, the image matching system 102 can optionally highlight the region(s) in the final matching image(s) which match the bounding region identified in block 806, e.g., by drawing a border around the appropriate region(s) in the final matching image(s). The image matching system 102 can also optionally output supplemental information, such as metadata (e.g., tags, labels, etc.) associated with final matching images. The user can optionally perform an additional search based on the content delivered by the search results. For example, the user can click on a hyper-linked tag in a final matching image to retrieve additional content associated with that tag.

In block 810, the image matching system 102 updates the index (provided by the indexing system 108) to include the final matching image(s) identified in block 808. As indicated by the dashed line, this updating operation can optionally be performed quickly enough so that a subsequent query image, submitted in a same image-capture session, can be matched against the preceding query image (which is now regarded as one of the reference images). This feedback provision provides a re-enforced learning mechanism.

In block 812, the image matching system 102 can identify connections among images that are revealed by the matching performed in block 808. The image matching system 102 can add these connections to the relationship information maintained by the relationship management module 112.

Figure 9:
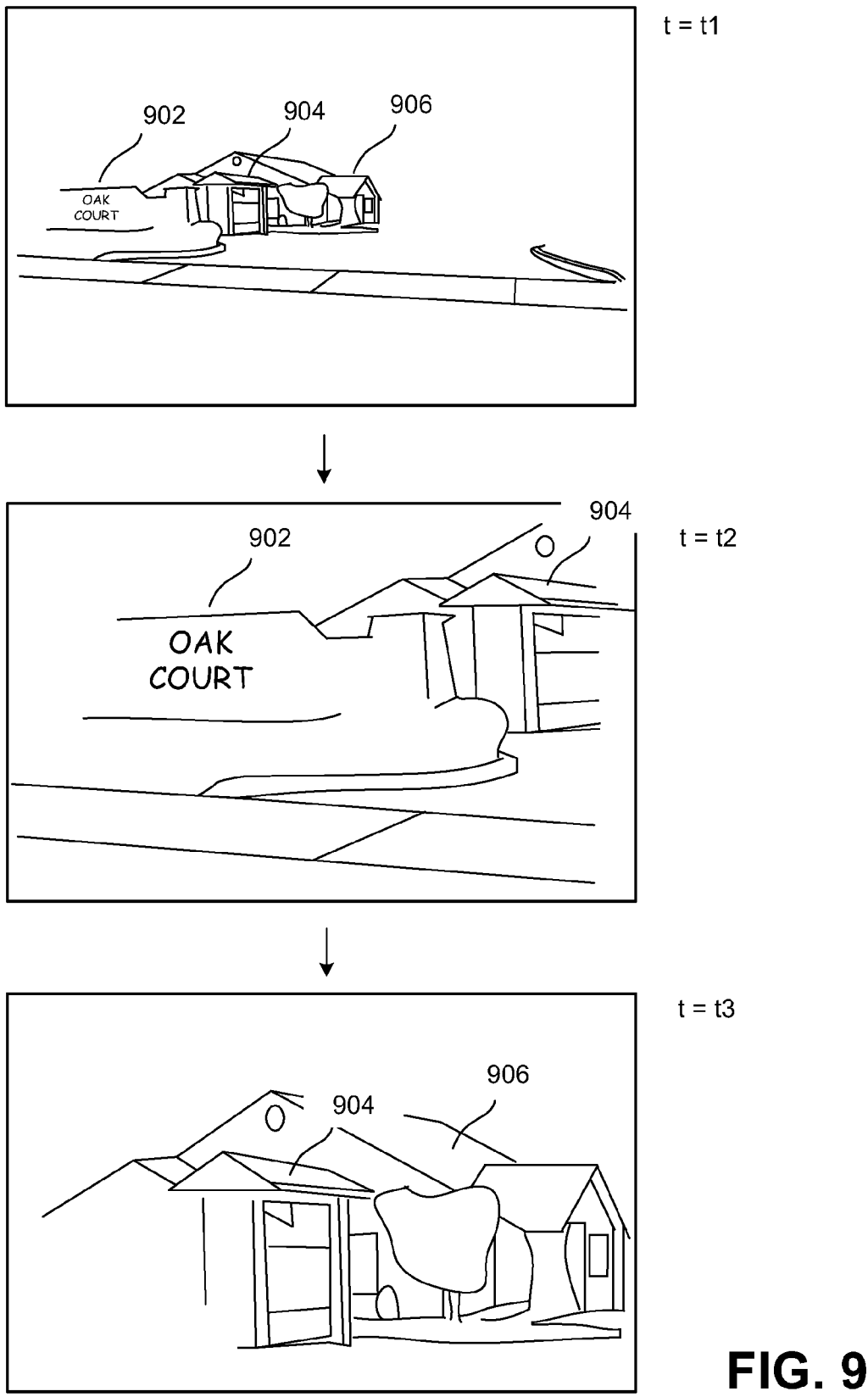
FIGS. 9 and 10 show a series of query images that may be captured and processed by the index matching system of FIG. 1.
Figure 10:
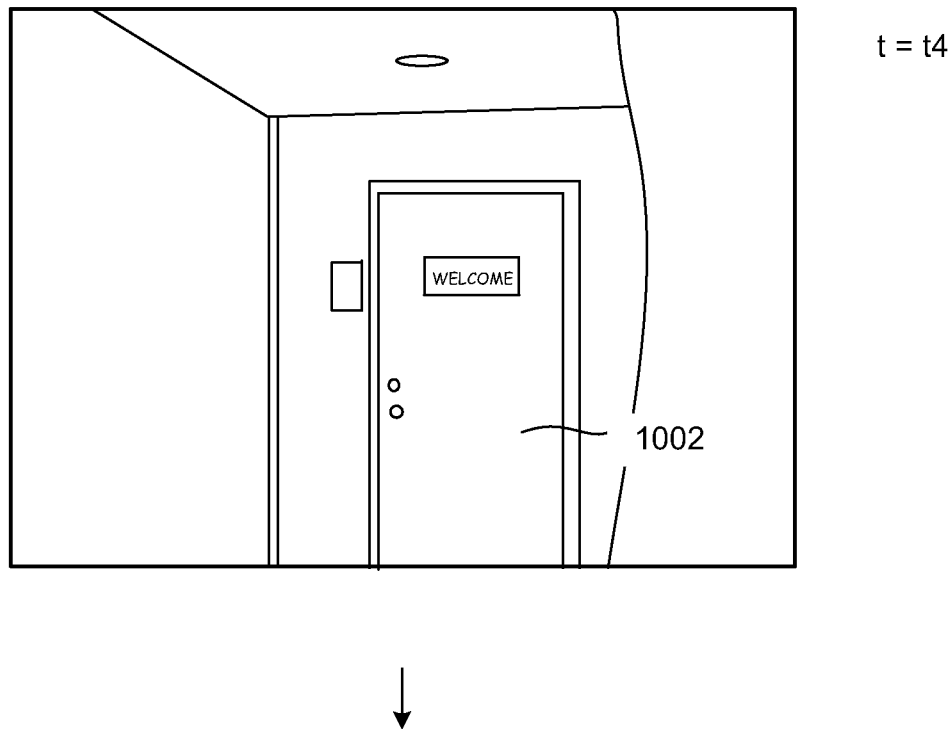
Figure 10:
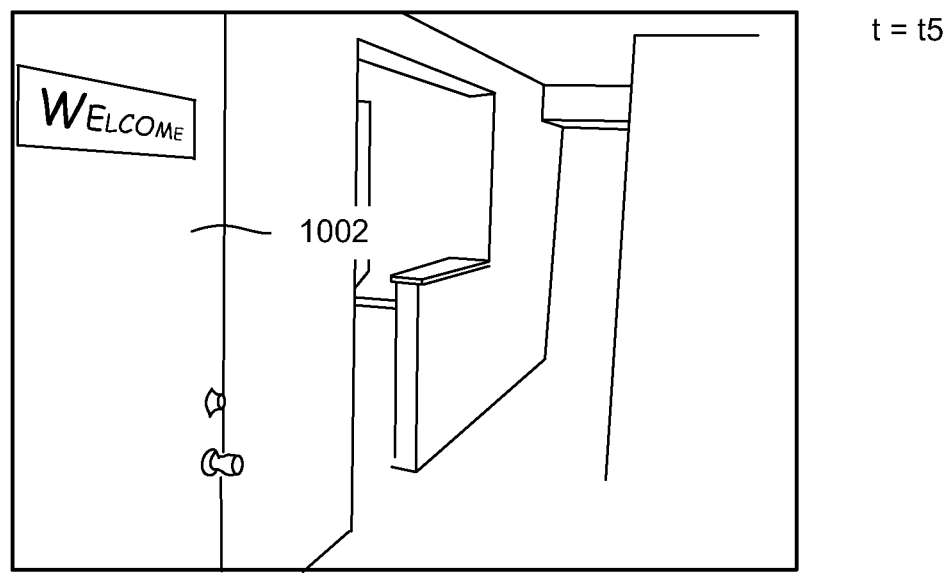

FIGS. 9 and 10 show a sequence of query images that a user may submit within a same query session. More specifically, assume that the user takes pictures of an apartment complex. The user starts by taking a roadside picture of the apartment complex (at time W. The user then further approaches the apartment complex to take a close-up picture of a sign 902, i.e., "Oak Court" (at time t2). The user then advances further into the development by taking a picture of the community mailbox 904 together with the front office 906 (at time t3). The use then advances to the front door 1002 of the front office 906 (at time t4). The user then opens the front door 1002 of the front office to take a picture of the foyer of the front office (at time t5).

In one implementation, the image matching system 102 performs matching quickly enough so that the query image captured at time t1 is added to the indexing system 108 by the time that the use captures the query image at time t2, and so on. In this manner, the query image at time t2 can be matched with the query image at time t1 (because both pictures have similar content).

The relationship management module 112 can leverage the above-described behavior by forming a seamless chain of images that connect the street-side picture of the complex (taken at time instance t1) with the interior picture of the front office (taken at time instance t5).

Assume now that, in a different scenario, the user has previously taken several pictures of the interior of the front office. But, initially, the relationship management module 112 may not be able to link these images to the exterior images of the front office, because query images have not yet been submitted which establish this nexus. Then assume that a user takes the particular pictures shown in FIG. 10. These new pictures may effectively link the suite of exterior pictures with the suite of interior pictures.

FIG. 7 illustrates the above-described concept in another way. Assume that the relationship information shown there reveals two themes, associated with two clusters of related images. But there is initially no link between the themes. Then assume that a user takes a bridging picture $I_q$ that establishes a nexus between the two themes. Henceforth, the relationship management module 112 can alert users to a potential connection between the two themes.

The scenarios described above (with respect to FIGS. 9 and 10) represents one or many applications of the technology described herein. In another case, the image matching system 102 can be used in conjunction with Photosynth™ technology provided by Microsoft Corporation of Redmond, Wash. This technology is further related to co-pending U.S. application Ser. No. 11/493,436, filed on Jul. 25, 2006, entitled "Navigating Images Using Image Based Geometric Alignment and Object Based Controls," naming the inventors of Keith Snavely, et al. In this technology, a user can take multiple pictures of a particular scene; the Photosynth™ technology then generates a synthesized three-dimensional representation of the scene.

In another case, the query images can be used in conjunction with augmented reality technology. Such technology augments query images in real time with metadata and other content that is deemed pertinent to the query images. For example, using this technology, a user can point his or her camera at a particular landmark and quickly receive information which explains the landmark, e.g., overlaid on the query image.

In another case, the user can use the image matching system 102 to perform "off line" image matching. In this scenario, the user can identify any previously captured (or generated) query image from any remote and/or local data store(s). The user can then use the image matching system 102 to compare this query image with any collection of reference images in any remote and/or local data store(s). In other words, the image matching system 102 is not restricted to the type of geographical-based matching shown in FIG. 1 (in which a user captures a query image of a physical scene).

Further, in many of the examples presented above, the user is interested in finding one or more reference images that represent the best matches between a query image and the corpus of reference images. In another scenario, the user may be more interested in enumerating all reference images which contain objects which match the query image. For example, a user may request the matching functionality 104 to identify all reference images that contain a particular feature, such as a particular sign, logo, building design, road pattern, etc. The matching functionality 104 can accommodate this type of search through its use of the inverted index. That is, the inverted index can associate a visual word (e.g., associated with a particular road sign) with a list of reference images which contain that visual word (e.g., all reference images which contain objects that resemble the road sign).

Advancing to FIG. 11, this figure shows a procedure 1100 that represents one technique for performing image matching. In block 1102, the imaging matching system 102 receives a new query image. In block 1104, the image matching system 102 generates features based on the query image, including both non-quantized image features and quantized image features. In block 1106, the image matching system 102 uses fast vocabulary-based matching (based on the quantized features) to identify a set of candidate reference images. In block 1108, the image matching system 102 uses verification analysis to identify one or more final matching images from the set of candidate references, e.g., by culling out matches that do not satisfy a requisite degree of confidence.

Figure 12:
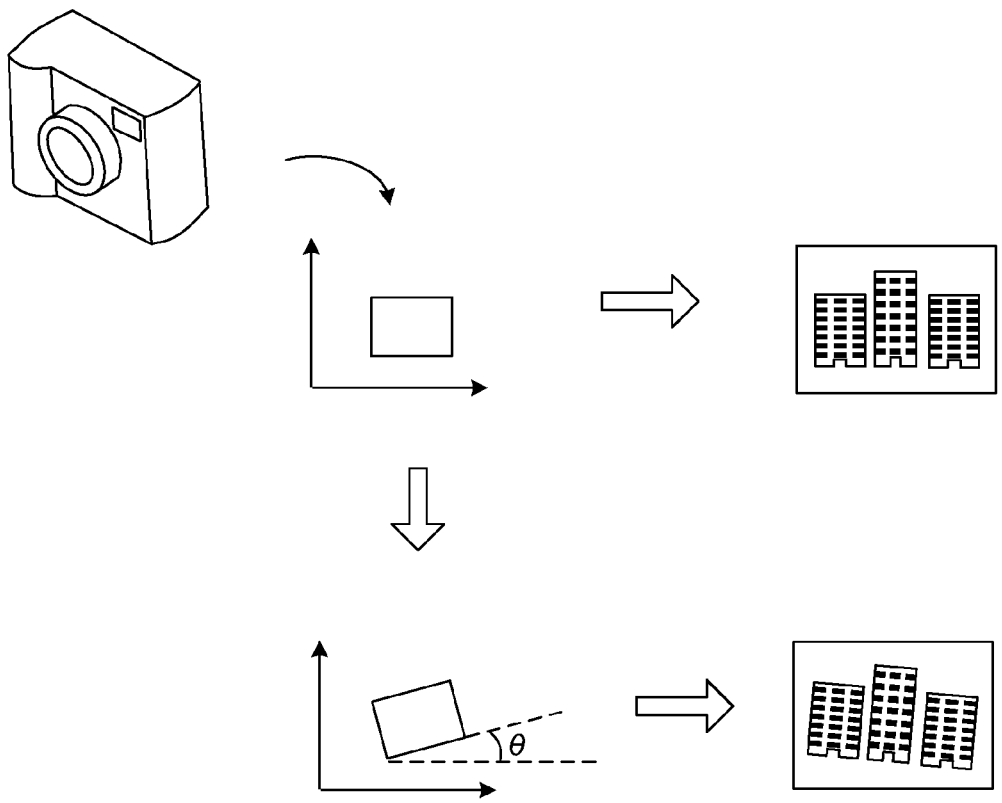
FIG. 12 is vehicle for explaining the concept of orientation information; the orientation information describes the orientation of a device upon capture of a query image.

FIG. 12 shows images that have been captured based on two different orientations of an image-capture device. Namely, the second orientation is skewed with respect to the first orientation. More specifically, in this example, the user has taken a query image of an object having regular structure, such as a building that has a regular array of windows. In this context, the regular structure in the second image appears "tilted" with respect to the regular structure in the first query image. In this example, the orientation information reflects a single degree of freedom, but, as stated in Section A, the orientation information can also be measured with respect to multiple degrees of freedom.

Figure 13:
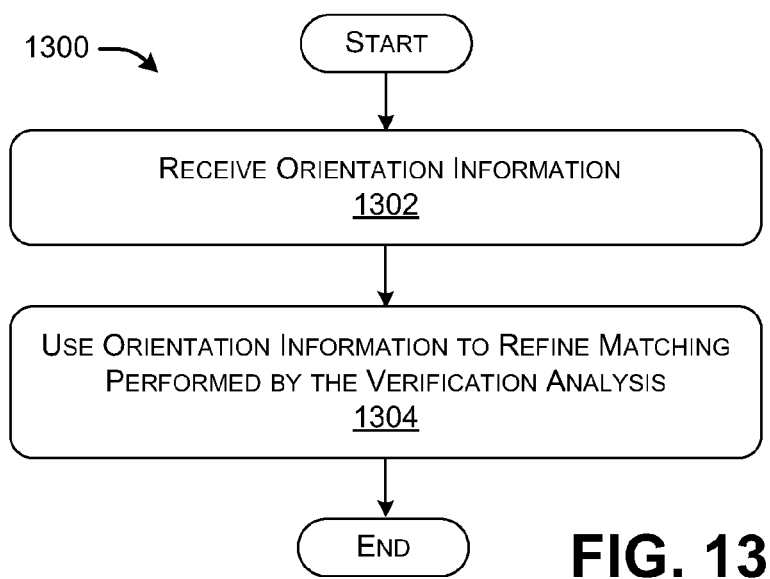
FIG. 13 is a flowchart that describes the use of the orientation information in the context of performing verification analysis.

FIG. 13 shows a procedure 1300 that can be used to leverage the above-described type of orientation information. In block 1302, the verification module 214 can receive orientation information associated with the query image. In block 1304, the verification module 214 can use the orientation information to refine its matching of the query image to each individual candidate reference image. For example, as described above, the verification module 214 can attempt to match image content in the query image with similarly-oriented image content in the reference image. The orientation information allows this matching to be performed in a more accurate manner, e.g., by effectively normalizing the capture-related skews associated with the scenario illustrated in FIG. 12.

Figure 14:
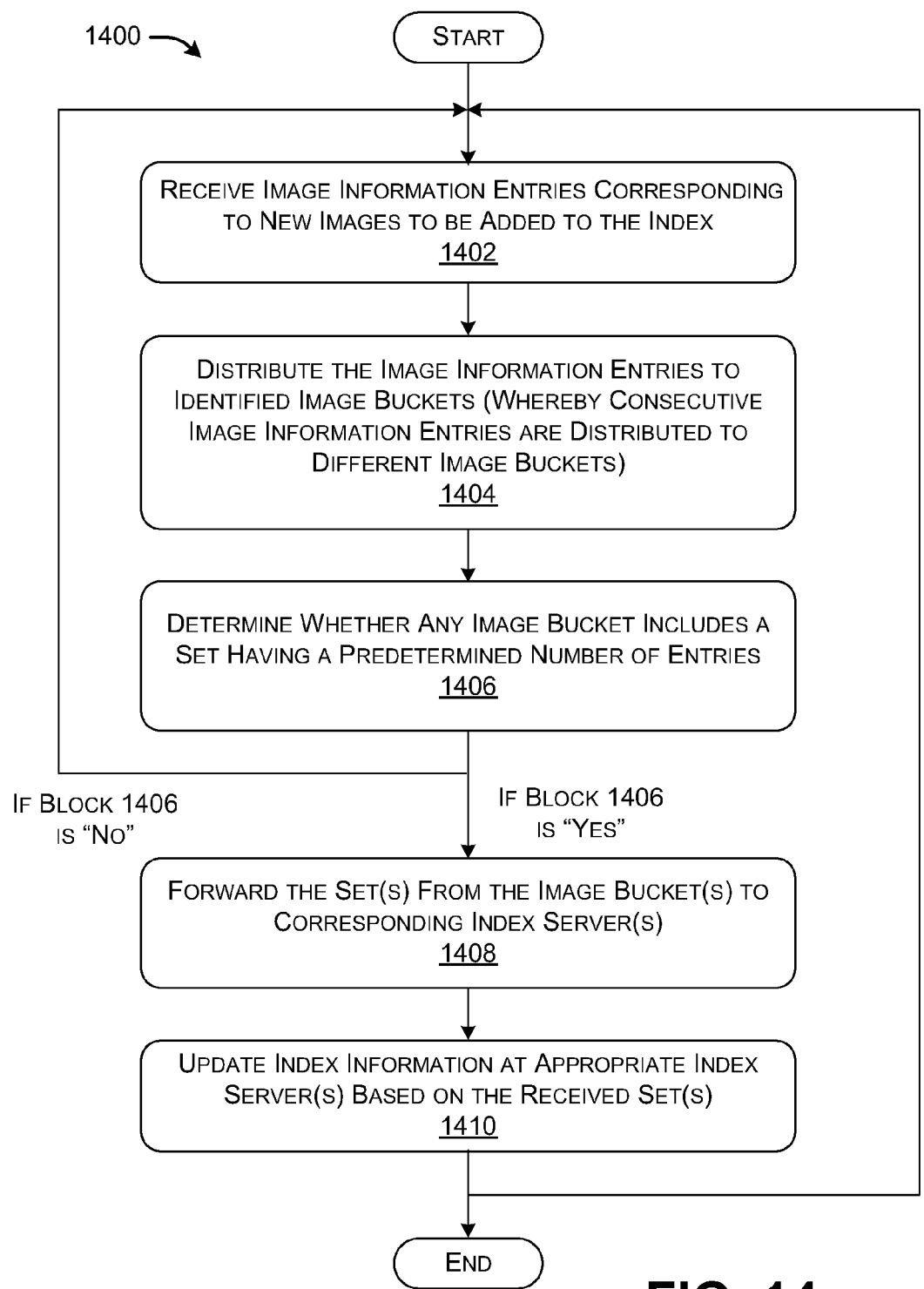
FIG. 14 is a flowchart that describes an updating operation performed by the index updating module of FIGS. 5 and 6.

FIG. 14 shows a procedure 1400 that represents one manner of operation of the index updating module 502 of FIG. 5 (and also the index updating module 602 of FIG. 6). In block 1402, the index updating module 502 receives image information entries that correspond to new reference images to be added to the indexing system 108. These new reference images may correspond to former query images that were deemed to match other reference images.

In block 1404, the index updating module 502 distributes the consecutively-received image information entries to the image buckets in round-robin fashion. In block 1406, the index updating module 502 determines whether any image bucket includes a bucket set that has reached a predetermined number of entries. If so, in block 1408, the index updating module 502 sends the bucket set to the corresponding index server(s). In block 1410, the recipient index sever(s) then add the received bucket set to its portion of the index information.

Figure 15:
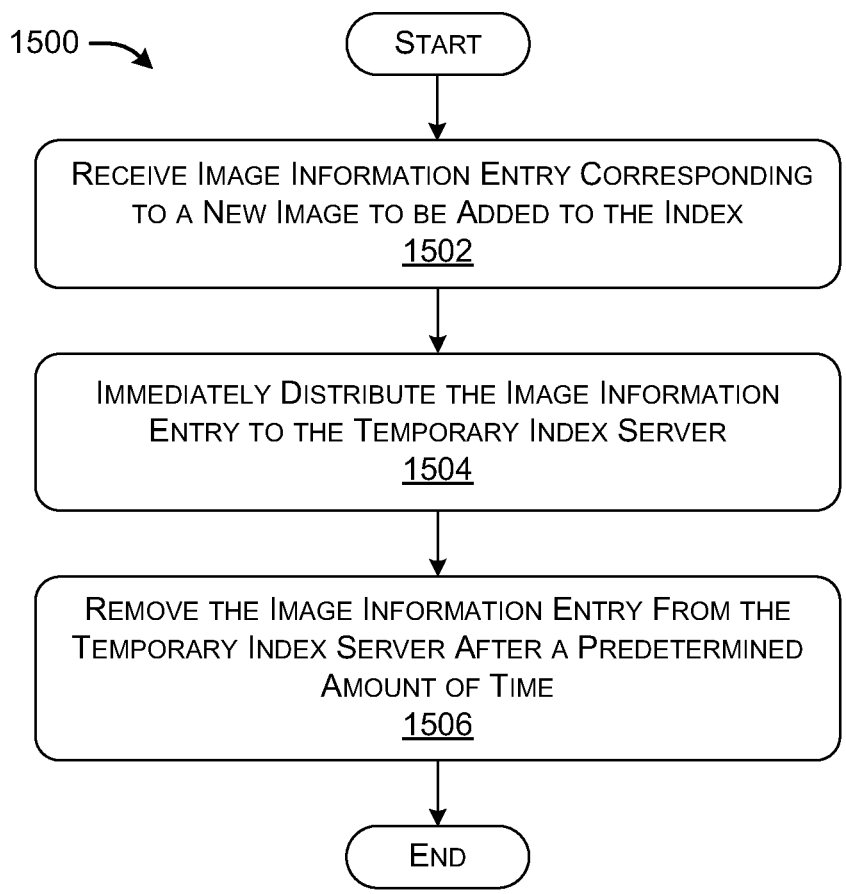
FIG. 15 is a flowchart that describes an updating operation performed by the index updating module of FIG. 6.

FIG. 15 shows a procedure 1500 that represents the modification shown in FIG. 6. This procedure 1500 can be performed in conjunction with the bucket-based updating shown in FIG. 14.

In block 1502, the index updating module 602 receives an image information entry corresponding to a new reference image to be added to the indexing system 108. In block 1504, the index updating module 602 distributes the image information entry to the temporary index server(s) 606, where it is available for immediate matching against future query images. In block 1506, after a prescribed time, the index updating module 602 removes the image information entry from the temporary index server(s) 606.

C. Representative Processing Functionality

FIG. 16 sets forth illustrative electrical data processing functionality 1600 that can be used to implement any aspect of the functions described above. The electrical data processing functionality 1600 represents a physical and tangible machine. With reference to FIGS. 1 and 2, for instance, the type of processing functionality 1600 shown in FIG. 16 can be used to implement any feature of the environment 100, such as the image matching system 102. In one case, the processing functionality 1600 may correspond to any type of computing device that includes one or more processing devices.

The processing functionality 1600 can include volatile and non-volatile memory, such as RAM 1602 and ROM 1604, as well as one or more processing devices 1606. The processing functionality 1600 also optionally includes various media devices 1608, such as a hard disk module, an optical disk module, and so forth. The processing functionality 1600 can perform various operations identified above when the processing device(s) 1606 executes instructions that are maintained by memory (e.g., RAM 1602, ROM 1604, or elsewhere).

More generally, instructions and other information can be stored on any computer readable medium 1610, including, but not limited to, static memory storage devices, magnetic storage devices, optical storage devices, and so on. The term computer readable medium also encompasses plural storage devices. In all cases, the computer readable medium 1610 represents some form of physical and tangible mechanism.

The processing functionality 1600 also includes an input/output module 1612 for receiving various inputs from a user (via input modules 1614), and for providing various outputs to the user (via output modules). One particular output mechanism may include a presentation module 1616 and an associated graphical user interface (GUI) 1618. The processing functionality 1600 can also include one or more network interfaces 1620 for exchanging data with other devices via one or more communication conduits 1622. The network interfaces 1620 can encompass wireless communication functionality for communicating with wireless communication infrastructure. One or more communication buses 1624 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, using a physical image matching system, of performing a search based on a query image, comprising:
   receiving a query image;
   receiving location information which indicates a location that is associated with the query image;
   identifying a bounding region associated with the location, based on the location information;
   identifying, using an index, a set of candidate reference images that match the query image and the bounding region;
   performing verification analysis to identify at least one final matching image, selected from among the candidate reference images, that successfully matches the query image, the verification analysis including
      mapping non-quantized features based on the query image into additional quantized features, and
      mapping points in the query image to corresponding points in the at least one final matching image by applying a geometric model that transforms each point in the query image into a corresponding point in the at least one final matching image; and
   updating the index to include at least one image information entry that corresponds, respectively, to the at least one final matching image that successfully matches the query image.

2. The method of claim 1, wherein the query image comprises a digital image produced by a mobile computing device at the location.

3. The method of claim 1, wherein said identifying of the set of candidate images comprises:
   generating quantized features based on the query image; and
   using the quantized features, together with the index, to identify the set of candidate reference images.

4. The method of claim 3, further comprising producing the quantized features using a vocabulary tree.

5. The method of claim 1, wherein said performing verification analysis comprises using the non-quantized features to identify said at least one final matching image by performing pair-wise comparison of the query image with each of the set of candidate reference images.

6. The method of claim 5, further comprising:
   receiving orientation information which indicates an orientation of a device that captured the query image; and
   using the orientation information to refine matching performed by the verification analysis.

7. The method of claim 1, wherein the query image is captured in a capture session in which plural query images are captured, and wherein said updating occurs prior to capture of a next query image among the plural query images.

8. The method of claim 1, wherein, for a particular final matching image, said updating comprises:
   distributing an image information entry, which corresponds to the final matching image, to an image bucket, selected from a plurality of image buckets;
   determining whether the image bucket has received a bucket set comprising a predetermined number of image information entries;
   upon the image bucket having received the predetermined number of image information entries, forwarding the bucket set to at least one associated index server; and
   updating, by said at least one index server, a portion of the index based on the bucket set.

9. The method of claim 1, further comprising updating relationship information to describe at least one relationship between the query image and said at least one final matching image.

10. The method of claim 1, further comprising using a temporary index server to receive a set anew reference images, wherein the temporary index server performs pair-wise verification analysis between the query image and any reference image in the set of new reference images that is associated with the bounding region, without use of the index.

11. An index updating module, implemented by physical data processing functionality, comprising:
one or more processing devices programmed to provide:
a receiving module configured to receive image information entries corresponding to a plurality of corresponding new images to be added to an index;
a distribution module configured to distribute the image information entries to image buckets;
a forwarding module configured to:
determine whether any image bucket has received a bucket set comprising a predetermined number of image information entries by counting a number of entries in each respective bucket; and
upon any image bucket having received the predetermined number of image information entries, forward the bucket set provided by the image bucket to at least one associated index server that updates a portion of the index based on the bucket set; and
a relationship management module that updates information indicating potential relationships between pluralities of images, based on a presence of a bridging picture that establishes a nexus between the pluralities.

12. The index updating module of wherein the new images to be added to the index correspond to query images that have been previously determined to match at least one reference image, identified by the index.

13. The index updating module of claim 11, wherein the distribution module is configured to distribute the image information entries such that two consecutively-captured new images provide image information entries that are distributed to two different respective image buckets.

14. The index updating module of claim 11, wherein the predetermined number of image information entries is set so that updating of the index occurs in less than one minute.

15. The index updating module of claim 11, further comprising a temporary index server management module configured to forward the image information entries to a temporary index server.

16. The index updating module of claim 15, wherein the temporary index server management module is configured to remove each image information entry from the temporary index server after a prescribed amount of time.

17. A computer usable storage device storing thereon computer readable instructions, the computer readable instructions providing an image matching system when executed by one or more processing devices, the computer readable instructions comprising:
logic configured to receive a query image;
logic configured to resolve a bounded region;
logic configured to identify least one final matching image, using an index, based on the query image and the resolved bounded region, each final matching image associated with an image information entry, the identifying including
mapping non-quantized features based on the query image into additional quantized features, and
mapping points in the query image to corresponding points in the at least one final matching image by applying a geometric model that transforms each point in the query image into a corresponding point in the at least one final matching image; and
logic configured to update the index, for each final matching image, to include the image information entry,
the query image being captured in a capture session in which plural query images are captured, and wherein said logic configured to update is configured to update the index prior to capture of a next query image among the plural query images.

18. The computer readable storage device of claim 17, wherein said logic configured to identify said at least one final matching image from a subset of reference images that are associated with a defined bounding region.

19. The computer readable storage device of claim 17, wherein said logic configured to identify comprises:
logic configured to identify, using the index, a set of candidate reference images that match the query image; and
logic configured to identify, based on verification analysis, said at least one final matching image from among the set of candidate reference images.

20. The computer readable storage device of claim 17, wherein the logic configured to update comprises:
logic configured to distribute each image information entry to an image bucket, selected from a plurality of image buckets;
logic configured to determine whether the image bucket has received a bucket set comprising a predetermined number of image information entries; and
logic configured to forward, if the image bucket has received the predetermined number of image information entries, the bucket set to at least one associated index server,
said at least one index server updating a portion of the index based on the bucket set.

21. The method of claim 1, wherein the location corresponds to a location of an object represented by the query image and not to a location of a user or device capturing the query image.

22. The method of claim 1, wherein the geometric model is a homographic model and the verification analysis includes augmenting the non-quantized features of the query image with location information that is resolved from a homographic analysis.

23. The computer readable storage device of claim 17, further comprising logic configured to select a shape of a bounded region associated with location information associated with a location that is associated with the query image, the selection being between a round shape and a non-round shape.

24. A method, using a physical image matching system, of performing a search based on a query image, comprising:
resolving a bounding region, based on location information that indicates a location that is associated with a received query image, the bounded region surrounding the location that is associated with the received query image;
identifying, using an index, a set of candidate reference images that match the query image and the bounding region;
selecting at least one of the identified candidate reference images as a final matching image that successfully matches the query image, by
mapping non-quantized features based on the query image into additional quantized features, and
mapping points in the query image to corresponding points in the at least one final matching image by applying a geometric model that transforms each point in the query image into a corresponding point in the at least one final matching image; and
updating the index to include at least one image information entry that corresponds, respectively, to the at least one final matching image that successfully matches the query image.

* * * * *